(12) United States Patent
Tabata et al.

(10) Patent No.: US 9,604,525 B2
(45) Date of Patent: Mar. 28, 2017

(54) CONTROL DEVICE FOR VEHICLE DRIVE DEVICE

(75) Inventors: Atsushi Tabata, Okazaki (JP); Tatsuya Imamura, Okazaki (JP); Tooru Matsubara, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 256 days.

(21) Appl. No.: 14/357,838

(22) PCT Filed: Nov. 14, 2011

(86) PCT No.: PCT/JP2011/076220
§ 371 (c)(1),
(2), (4) Date: May 13, 2014

(87) PCT Pub. No.: WO2013/072998
PCT Pub. Date: May 23, 2013

(65) Prior Publication Data
US 2014/0309079 A1    Oct. 16, 2014

(51) Int. Cl.
*B60W 10/02* (2006.01)
*B60K 1/02* (2006.01)
(Continued)

(52) U.S. Cl.
CPC ............... *B60K 1/02* (2013.01); *B60K 6/442* (2013.01); *B60K 6/485* (2013.01); *B60K 6/547* (2013.01);
(Continued)

(58) Field of Classification Search
None
See application file for complete search history.

(56) References Cited

U.S. PATENT DOCUMENTS

2001/0005704 A1*  6/2001  Kitano ............... B60K 6/52
                                                    477/107
2008/0004156 A1   1/2008  Tabata et al.
(Continued)

FOREIGN PATENT DOCUMENTS

CN    101638091 A    2/2010
JP    08-042660      2/1996
(Continued)

*Primary Examiner* — Erin D Bishop
(74) *Attorney, Agent, or Firm* — Andrews Kurth Kenyon LLP

(57) ABSTRACT

A vehicle-drive-device control device controls an operating point of the engine by adjusting a torque of a first electric motor, such that a sum of the engine torque and the first electric motor torque is balanced with a torque of an input-side rotating element of a fluid transmission device, which is generated depending on a speed ratio of the fluid transmission device. The control device obtains the input-side rotating element torque based on the engine rotation speed indicated by a target engine operating point, and to determine the first electric motor torque based on the obtained torque and the engine torque indicated by the target engine operating point. The control device adjusts the first electric motor torque while giving/receiving the electric power between the first and second electric motors, to make the speed ratio lower when a temperature of operating oil is low, than when the temperature is high.

10 Claims, 14 Drawing Sheets

(51) Int. Cl.
    *B60K 6/547*         (2007.10)
    *B60W 10/08*        (2006.01)
    *B60K 6/442*         (2007.10)
    *B60K 6/485*         (2007.10)
    *B60W 30/194*      (2012.01)
    *B60K 6/48*          (2007.10)

(52) U.S. Cl.
    CPC .......... *B60W 10/023* (2013.01); *B60W 10/08* (2013.01); *B60W 30/194* (2013.01); *B60K 2006/4825* (2013.01); *B60W 2710/1072* (2013.01); *B60Y 2400/426* (2013.01); *Y02T 10/6226* (2013.01); *Y02T 10/6234* (2013.01); *Y02T 10/6252* (2013.01); *Y02T 10/7258* (2013.01); *Y10T 477/26* (2015.01)

(56) References Cited

U.S. PATENT DOCUMENTS

2009/0326778 A1    12/2009    Soliman et al.
2012/0215392 A1     8/2012    Hashimoto

FOREIGN PATENT DOCUMENTS

| JP | 2009-236132 A | 10/2009 |
| JP | 2010-000815 A | 1/2010 |
| JP | 2010-215190 A | 9/2010 |
| WO | 2011/070673 A1 | 6/2011 |

\* cited by examiner

FIG.2

|     | C1 | C2 | B1 | B2 | B3 |
|-----|----|----|----|----|-----|
| 1st | ○  |    |    | ○  |    |
| 2nd | ○  |    | ○  |    |    |
| 3rd | ○  |    |    |    | ○  |
| 4th | ○  | ○  |    |    |    |
| 5th |    | ○  |    |    | ○  |
| 6th |    | ○  | ○  |    |    |
| R   |    |    |    | ○  | ○  |
| N   |    |    |    |    |    |

○ ENGAGED

CONTROL DEVICE FOR VEHICLE DRIVE DEVICE

CROSS-REFERENCE TO RELATED APPLICATIONS

This is a national phase application based on the PCT International Patent Application No. PCT/JP2011/076220 filed Nov. 14, 2011, the entire contents of which are incorporated herein by reference.

TECHNICAL FIELD

The present invention relates to a control device of a vehicle drive device including an engine, an electric motor, and a fluid transmission device such that the power of the engine can be transmitted through a plurality of transmission paths.

BACKGROUND ART

A vehicle drive device is well known that includes a fluid transmission device having an input-side rotating element to which power from an engine is input and an output-side rotating element outputting power to drive wheels. For example, this corresponds to a vehicle drive device described in Patent Document 1. Such a vehicle drive device has an engine rotation speed (corresponding to a rotation speed of the input-side rotating element of the fluid transmission device) passively determined depending on a vehicle speed (corresponding to a rotation speed of the output-side rotating element of the fluid transmission device), the characteristic of the fluid transmission device, and the engine output. Power transmission efficiency is also passively determined in a mechanical path for fluid transmission of the engine output through the fluid transmission device.

If a temperature of operating oil (operating oil temperature) for actuating the fluid transmission device or an automatic transmission disposed on the subsequent stage of the fluid transmission device is lower, controllability may deteriorate in certain control in the fluid transmission device or the automatic transmission. Therefore, for example, it is contemplated that the certain control is not provided until warm-up completion when the operating oil temperature reaches a predetermined oil temperature or higher. However, the absence of implementation of the certain control may lead to deterioration in fuel efficiency performance or deterioration in power performance. Therefore, it is desirable to promote the warm-up of the fluid transmission device and the automatic transmission. For example, the warm-up of the fluid transmission device and the automatic transmission mainly depends on a heat loss due to a power transmission loss and, if an operating point is determined, the warm-up requires a certain time corresponding to the operating point. In a technique proposed in Patent Document 1, an electric motor is included for a stator impeller of a torque converter and if an operating oil temperature is equal to or less than a predetermined value, the stator impeller is rotationally driven by the electric motor to reduce a capacity coefficient of the torque converter and make a loss of the torque converter larger, thereby promoting the warm-up.

PRIOR ART DOCUMENT

Patent Document

Patent Document 1: Japanese Laid-Open Patent Publication No. 2009-236132

SUMMARY OF THE INVENTION

Problem to be Solved by the Invention

In the technique described in Patent Document 1, since proper electric power is required for driving the electric motor, the technique cannot be implemented in some range depending on a charged capacity etc. of a battery supplying electric power to the electric motor. The technique cannot be implemented while it is desired to increase the charged capacity of the battery. The problem as described above is unknown and no proposal has hitherto been made on increasing a loss of the fluid transmission device regardless of the charged capacity etc. of the battery so as to promote warm-up.

The present invention was conceived in view of the situations and it is therefore an object of the present invention to provide a control device of a vehicle drive device capable of adjusting a torque of an electric motor to control an engine operating point so as to promote warm-up.

Means for Solving the Problem

To achieve the object, the first aspect of the invention provides (a) a control device of a vehicle drive device including a fluid transmission device having an input-side rotating element to which power from an engine is input and an output-side rotating element outputting power to drive wheels, a first electric motor directly or indirectly coupled to the input-side rotating element, and a second electric motor directly or indirectly coupled to the drive wheels, (b) the control device of a vehicle drive device having an electric path through which power is electrically transmitted by giving/receiving electric power between the first electric motor and the second electric motor and a mechanical path through which power is mechanically transmitted via the fluid transmission device, the control device of a vehicle drive device being configured to control an operating point of the engine by adjusting a torque of the first electric motor, (c) the control device of a vehicle drive device adjusting a torque of the first electric motor while giving/receiving electric power between the first electric motor and the second electric motor to reduce a speed ratio of the fluid transmission device when a temperature of operating oil for actuating the fluid transmission device is lower as compared to when the temperature is higher.

Effects of the Invention

Consequently, since the operating point of the engine can be controlled without being constrained by a rotation speed of the output-side rotating element by adjusting the torque of the first electric motor, the engine can be driven at an operating point optimal for the fuel efficiency improvement, for example, and the vehicle fuel efficiency can be improved. Additionally, since the control of the operating point of the engine can be provided by adjusting the torque of the first electric motor, the speed ratio of the fluid transmission device can be reduced while giving/receiving electric power between the first electric motor and the second electric motor and, therefore, the transmission loss in the fluid transmission device is increased to increase the heat generation amount. Thus, a rise in the operating oil temperature can obviously be promoted, and the rise in the operating oil temperature can promote warm-up of an apparatus actuated by the operating oil. Since the adjustment of the torque of the first electric motor is performed by giving/receiving electric power between the first electric motor and the second electric motor, the loss of the fluid transmission device can be increased regardless of the charged capacity of the battery (electric storage device) etc. Therefore, the warm-up can be promoted in a wider range without being limited by the charged capacity of the electric storage device etc.

The second aspect of the invention provides the control device of a vehicle drive device recited in the first aspect of the invention, wherein the torque of the first electric motor is adjusted such that a sum of an engine torque and the torque of the first electric motor is balanced with an input-side load torque generated in the input-side rotating element depending on a speed ratio of the fluid transmission device, and wherein the input-side load torque is obtained based on an engine rotation speed indicated by a target engine operating point, and wherein the torque of the first electric motor is determined based on the input-side load torque and the engine torque indicated by the target engine operating point. Consequently, the torque of the first electric motor can easily be adjusted based on the characteristics of the fluid transmission device.

The third aspect of the invention provides the control device of a vehicle drive device recited in the second aspect of the invention, wherein a power running torque of the first electric motor is increased to raise an engine rotation speed relative to an engine operating point at which the engine torque is balanced with the input-side load torque, thereby setting the target engine operating point so as to realize a target speed ratio set in advance to be smaller when the temperature of the operating oil is lower. Consequently, the transmission loss of the fluid transmission device is increased to increase the heat generation amount and the warm-up of the apparatus actuated by the operating oil can properly be promoted. Since the power circulation state is achieved in giving/receiving of the electric power between the first electric motor and the second electric motor, an increase in loss is also expected from this state.

The fourth aspect of the invention provides the control device of a vehicle drive device recited in the second aspect of the invention, wherein a regenerative torque of the first electric motor is reduced and an engine rotation speed is increased relative to an engine operating point at which an operating point of the engine is along a predefined operating curve of the engine while a target value of engine output is achieved, thereby setting the target engine operating point so as to realize a target speed ratio set in advance to be smaller when the temperature of the operating oil is lower. Consequently, the transmission loss of the fluid transmission device is increased to increase the heat generation amount and the warm-up of the apparatus actuated by the operating oil can properly be promoted.

The fifth aspect of the invention provides the control device of a vehicle drive device recited in any one of the first to fourth aspects of the invention, wherein the vehicle drive device includes an automatic transmission interposed between the output-side rotating element and the drive wheels, and wherein the operating oil is oil for actuating the automatic transmission. Consequently, the warm-up of the automatic transmission can be promoted by the fluid transmission device.

The sixth aspect of the invention provides the control device of a vehicle drive device recited in the fifth aspect of the invention, wherein when a temperature of the operating oil is lower, a gear ratio of the automatic transmission is set to a gear ratio on the higher vehicle speed side. Consequently, a range of reducing the speed ratio of the fluid transmission device (e.g., a range of increasing the engine rotation speed) is expanded and the warm-up can further be promoted by setting the gear ratio of the automatic transmission to a gear ratio on the higher vehicle speed side.

The seventh aspect of the invention provides the control device of a vehicle drive device recited in the fifth or sixth aspect of the invention, wherein when the speed ratio of the fluid transmission device is reduced, if at least one operating point of the first electric motor and the second electric motor is out of respective preset rated outputs of the first electric motor and the second electric motor, a shift of the automatic transmission is performed such that the operating points fall within the rated outputs. Consequently, since the adjustment of the torque of the first electric motor can properly be performed by giving/receiving electric power between the first electric motor and the second electric motor, the loss of the fluid transmission device can properly be increased regardless of the charged capacity of the electric storage device etc.

The eighth aspect of the invention provides the control device of a vehicle drive device recited in the seventh aspect of the invention, wherein if a rotation speed of the first electric motor is out of the rated output at the torque of the first electric motor at the time of the adjusting for reducing the speed ratio of the fluid transmission device, an upshift of the automatic transmission is performed, and wherein if a torque of the second electric motor for acquiring power of the second electric motor in giving/receiving of electric power between the first electric motor and the second electric motor is out of the rated output, a downshift of the automatic transmission is performed. Consequently, since the adjustment of the torque of the first electric motor can certainly be performed by giving/receiving the electric power between the first electric motor and the second electric motor, the loss of the fluid transmission device can certainly be increased regardless of the charged capacity of the electric storage device etc.

The ninth aspect of the invention provides the control device of a vehicle drive device recited in any one of the first to eighth aspects of the invention, wherein if no warm-up request is made for the vehicle drive device, the toque of the first electric motor is adjusted such that an operating point of the engine is along a predefined operating curve of the engine while a target value of the engine output is achieved, thereby controlling the operating point of the engine. Consequently, if no warm-up request is made for the vehicle drive device, the engine is operated at an engine operating point at which engine efficiency is as high as possible, i.e., an engine operating point at which fuel consumption rate is as low as possible.

The tenth aspect of the invention provides the control device of a vehicle drive device recited in the ninth aspect of the invention, wherein total efficiency is represented by a product of power transmission efficiency when power from the engine is transmitted through the electric path and the mechanical path and engine efficiency at an operating point of the engine, and wherein the total efficiency is sequentially obtained while the operating point of the engine is shifted, so as to shift the operating point of the engine to the side of greater total efficiency. Consequently, as compared to the case that the operating point of the engine is not changed depending on the total efficiency, the efficiency of the vehicle drive device is increased as a whole and the vehicle fuel efficiency can be improved.

BRIEF DESCRIPTION OF THE DRAWINGS

FIG. 2 is an operation table of hydraulic friction engagement devices for establishing shift stages in the automatic transmission of FIG. 1.

MODE FOR CARRYING OUT THE INVENTION

Figure 1:
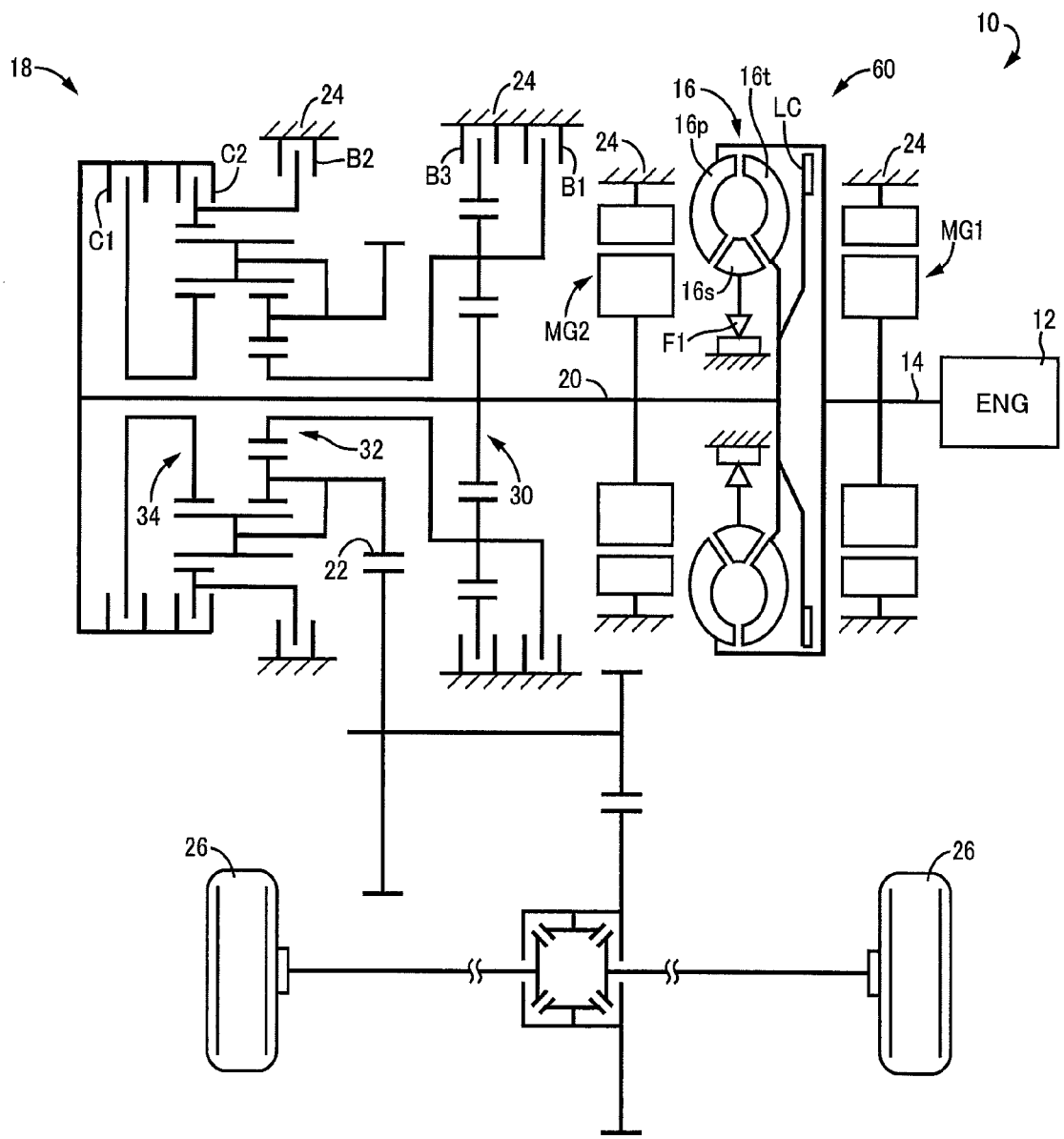
FIG. 1 is a schematic for explaining a configuration of a vehicle drive device of an example of the present invention.

In the present invention, preferably, fuel efficiency refers to a running distance per unit fuel consumption etc., and improvement in fuel efficiency refers to extension of the running distance per unit fuel consumption, or reduction in fuel consumption rate (=fuel consumption/drive wheel output) of a vehicle as a whole.

Preferably, an operating point of a rotating apparatus is an operating point indicative of an operating state of the rotating apparatus represented by a rotation speed and an output torque of the rotating apparatus. For example, the operating point of the engine is an operating point indicative of an operating state of the engine represented by a rotation speed and an output torque of the engine. In other words, the operating point of the engine refers to an operating state of the engine indicated by one point in two-dimensional coordinates of an axis indicative of the rotation speed of the engine and an axis indicative of the output torque of the engine.

Preferably, the fluid transmission device is a torque converter including a pump impeller that is the input-side rotating element, a turbine impeller that is the output-side rotating element, and a stator impeller.

Preferably, the vehicle drive device includes an electric storage device connected to each of the first electric motor and the second electric motor such that electric power can be given/received and, for example, the second electric motor is supplied with a remaining portion of the electric power generated by the first electric motor after subtracting electric power to be stored into the electric storage device, so as to drive the second electric motor.

Preferably, adjusting the torque of the first electric motor means adjusting power (electric power) transmitted through the electric path, or in other words, adjusting a power transmission rate of the electric path or the mechanical path. Therefore, the operating point of the engine is controlled by adjusting the power transmitted through the electric path.

Preferably, the electric path is a power transmission path through which power is electrically transmitted by supplying all or a portion of the electric power generated by the first electric motor to the second electric motor.

Preferably, when the temperature of the operating oil is lower, a proportion of the power transmitted through the mechanical path is made larger between the power transmitted through the mechanical path and the power transmitted through the electric path. As a result, when the temperature of the operating oil is lower, a loss due to the mechanical path can be increased to facilitate a rise in temperature of the operating oil so as to improve the warm-up performance. In other words, when the temperature of the operating oil is lower, the power transmitted through the mechanical path can be increased to make the loss larger so as to promote the warm-up.

An example of the present invention will now be described in detail with reference to the drawings.

EXAMPLE

FIG. 1 is a schematic for explaining a configuration of a vehicle drive device 10 of an example of the present invention. In FIG. 1, the vehicle drive device 10 is preferably employed in FF (front-engine front-drive) type vehicles and includes an engine 12 that is an internal-combustion engine, a torque converter (fluid transmission device) 16 coupled to a crankshaft 14 of the engine 12, an automatic transmission 18 disposed between the torque converter 16 and drive wheels 26 and coupled to the output side of the torque converter 16, a first electric motor MG1 disposed between the engine 12 and the torque converter 16 and coupled to the crankshaft 14, and a second electric motor MG2 disposed between the torque converter 16 and the automatic transmission 18 and coupled to an input shaft 20 of the automatic transmission 18.

The torque converter 16 is a fluid transmission device including a pump impeller 16p acting as an input-side rotating element to which power from the engine 12 is input, a turbine impeller 16t acting as an output-side rotating element outputting power to the drive wheels 26, a stator impeller 16s, and a unidirectional clutch F1. The pump impeller 16p, i.e., a pump impeller, is coupled to the crankshaft 14 of the engine 12 and the first electric motor MG1 and is rotationally driven by the engine 12 to generate a fluid flow due to a flow of the operating oil in the torque converter 16. The turbine impeller 16t, i.e., a turbine runner, is coupled to the input shaft 20 of the automatic transmission 18 and rotated in response to the fluid flow from the pump impeller 16p. The stator impeller 16s is disposed in the fluid flow from the pump impeller 16p to the turbine impeller 16t and supported by the unidirectional clutch F1 rotatably in the positive rotation direction of the crankshaft 14 (the rotation direction of the crankshaft 14 during the operation of the engine 12) and non-rotatably in the negative rotation direction. The input shaft 20 of the automatic transmission 18 also acts as an output shaft, i.e., a turbine shaft, of the torque converter 16. As can be seen from FIG. 1, since the engine 12, the first electric motor MG1, and the pump impeller 16p are coupled in series in this example, a rotation speed Np of the pump impeller 16p (hereinafter referred to as a pump rotation speed Np) is the same as a rotation speed Nmg1 of the first electric motor MG1 (hereinafter referred to as a first electric motor rotation speed Nmg1) and a rotation speed Ne of the engine 12 (hereinafter referred to as an engine rotation speed Ne). Since the turbine impeller 16t, the second electric motor MG2, and the input shaft 20 of the automatic transmission 18 are coupled in series, a rotation speed Nt of the turbine impeller 16t (hereinafter referred to as a turbine rotation speed Nt) is the same as a rotation speed Nmg2 of the second electric motor MG2 (hereinafter referred to as a second electric motor rotation speed Nmg2) and a rotation speed Natin of the input shaft 20 (hereinafter referred to as a transmission input rotation speed Natin).

The torque converter 16 includes a lockup clutch LC selectively coupling the pump impeller 16p and the turbine impeller 16t. The lockup clutch LC is operated through operating oil from a hydraulic control circuit 90 (see FIG. 3) and is controlled to one of a completely engaged state, a slipping state, and a released state. When the lockup clutch LC is in the released state, the torque is transmitted between the crankshaft 14 and the input shaft 20 via the operating oil in the torque converter 16 as described above. When the lockup clutch LC is in the completely engaged state, the lockup clutch LC mechanically directly couples the pump impeller 16p and the turbine impeller 16t and, therefore, the crankshaft 14 of the engine 12 and the input shaft 20 of the automatic transmission 18 are integrally coupled to each other and the torque is directly transmitted between the crankshaft 14 and the input shaft 20 without the intervention of the operating oil in the torque converter 16.

The first electric motor MG1 is coupled to the crankshaft 14 of the engine 12 in series via a damper etc., absorbing pulsation, for example, and is directly coupled to the pump impeller 16p of the torque converter 16. In short, the first electric motor MG1 is coupled to a power transmission path between the engine 12 and the torque converter 16. The second electric motor MG2 is coupled to a power transmission path between the torque converter 16 and the drive wheels 26 and is specifically coupled to the drive wheels 26 indirectly via the automatic transmission 18 etc. The first electric motor MG1 and the second electric motor MG2 are rotating machines configured to selectively acquire a function as an electric motor generating a drive torque and a function as an electric generator generating a regenerative torque and are made up of AC synchronous motor generators, for example. An electric storage device 36 acting as a battery and an inverter 38 for controlling the electric motors MG1 and MG2 are disposed in the vehicle drive device 10 (see FIG. 3), and the electric storage device 36, the first electric motor MG1, and the second electric motor MG2 are connected such that electric power can mutually be given/received. The first electric motor MG1 and the second electric motor MG2 can apply a drive torque in the positive rotation direction to the crankshaft 14 and the input shaft 20, respectively, through the drive thereof. The first electric motor MG1 and the second electric motor MG2 and can apply a load torque, i.e., a braking torque, in the negative rotation direction to the crankshaft 14 and the input shaft 20, respectively, through the electric generation (regeneration) thereof while charging the electric storage device 36 disposed in a vehicle via the inverter 38. The positive rotation direction of the crankshaft 14 and the input shaft 20 is the rotation direction of the crankshaft 14 while the engine 12 is driven and the negative rotation direction is the rotation direction opposite to the positive rotation direction.

The automatic transmission 18 is interposed between the torque converter 16 and the drive wheels 26 and is a mechanical transmission making up a portion of a power transmission path between the second electric motor MG2 and the drive wheels 26. Specifically, the automatic transmission 18 is a known planetary-gear type multistage transmission including a first planetary gear device 30, a second planetary gear device 32, a third planetary gear device 34, and a plurality of hydraulic friction engagement devices C1, C2, B1, B2, and B3, in a transmission case 24 that is a non-rotating member. The automatic transmission 18 outputs the power of the engine 12 input to the input shaft 20 acting as an input rotating member, from an output gear 22 acting as an output rotating member toward the drive wheels 26. In the automatic transmission 18, the known hydraulic friction engagement devices (clutches C1, C2, brakes B1, B2, B3) are respectively engaged or released by the operating oil from the hydraulic control circuit 90 (see FIG. 3) in accordance with a predetermined operation table depicted in FIG. 2 to alternatively establish a plurality of shift stages having respective different gear ratios γat (=transmission input rotation speed Natin/rotation speed Nout of the output gear 22) of the automatic transmission 18. In FIG. 2, "○" indicates an engaged state and a blank indicates a released state. The automatic shift control of the automatic transmission 18 is provided in accordance with a known relationship (shift diagram, shift map) having preliminarily stored upshift and downshift lines.

The vehicle drive device 10 configured as described above switches and actuates the engine running causing a vehicle to run with the power of the engine 12 and the motor running causing a vehicle to run with the power of the second electric motor MG2, depending on a running state of the vehicle. The switching between the engine running and the motor running is performed based on whether a running state of the vehicle belongs to an engine running range or a motor running range set in the same two-dimensional coordinates as the shift diagram.

In the vehicle drive device 10, for example, even when the vehicle running state belongs to the motor running range, if a state of charge (charged capacity, charge remaining amount) SOC of the electric storage device 36 is equal to or less than a predetermined value, the engine running is performed. When the vehicle is suddenly started or rapidly accelerated, the control is provided as needed such as using output of both the engine 12 and the second electric motor MG2 for running the vehicle.

Figure 3:
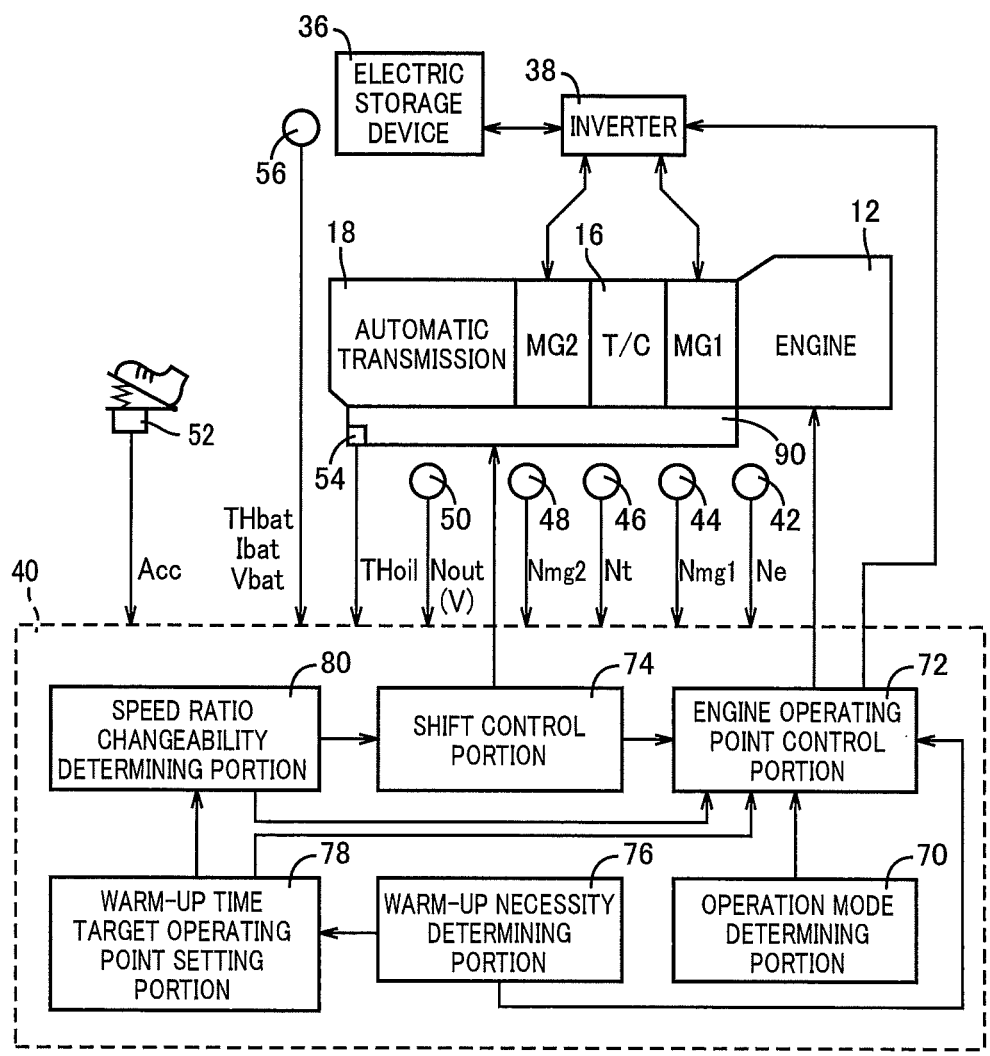
FIG. 3 is a diagram for explaining input signals input from sensors to an electronic control device for controlling the vehicle drive device of FIG. 1 and is a functional block diagram for explaining a main portion of the control function included in the electronic control device.

FIG. 3 is a diagram for explaining input signals input from sensors to an electronic control device 40 for controlling the vehicle drive device 10 and is a functional block diagram for explaining a main portion of the control function included in the electronic control device 40. In FIG. 3, the electronic control device 40 has a function as a control device of the vehicle drive device 10 and includes a so-called microcomputer equipped with a CPU, a RAM, a ROM, and an input/output interface, and the CPU executes signal processes in accordance with programs stored in advance in the ROM, while utilizing a temporary storage function of the RAM, to provide the output control of the engine 12, the shift control of the automatic transmission 18, and the output control of the electric motors MG1 and MG2. The electronic control device 40 is supplied with various input signals (e.g., the engine rotation speed Ne, the first electric motor rotation speed Nmg1, the turbine rotation speed Nt, the second electric motor rotation speed Nmg2, a transmission output rotation speed Nout that is a rotation speed of the output gear 22 corresponding to a vehicle speed V, an acceleration opening degree Acc, an operating oil temperature THoil that is a temperature of the operating oil actuating the torque converter 16 and the automatic transmission 18, and a battery temperature THbat, a battery charge/discharge current Ibat, and a battery voltage Vbat of the electric storage device 36) detected by respective sensors (e.g., rotation speed sensors 42, 44, 46, 48, 50, an accelerator opening degree sensor 52, an oil temperature sensor 54, and a battery sensor 56) depicted in FIG. 3 disposed on the vehicle. The electronic control device 40 supplies various output signals (e.g., an engine output control signal, an electric motor output control signal, and an oil pressure control signal) to devices disposed on the vehicle (e.g., the engine 12, the inverter 38, and the hydraulic control circuit 90). The electronic control device 40 sequentially calculates the charged capacity SOC of the electric storage device 36 based on the battery temperature THbat, the battery charge/discharge current Ibat, and the battery voltage Vbat, for example.

Figure 4:
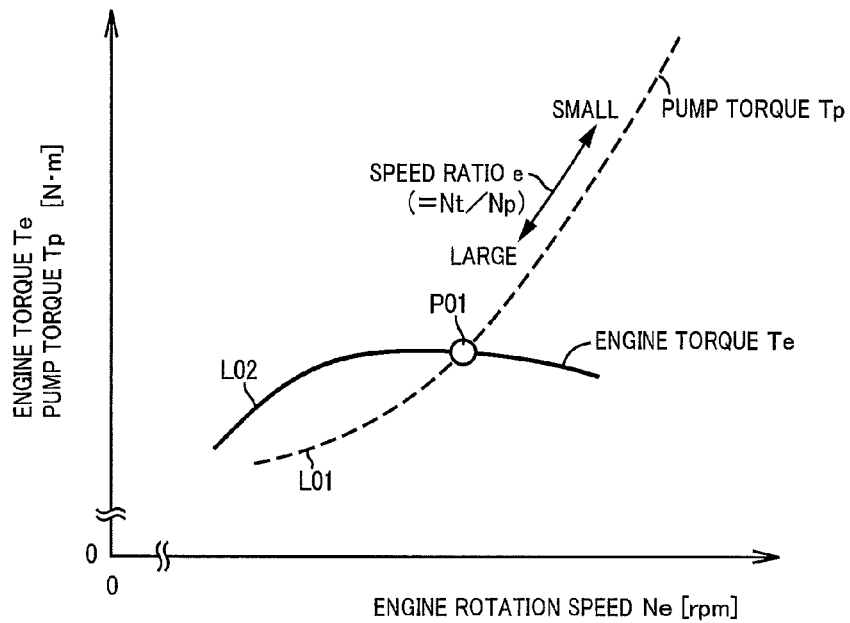
FIG. 4 is a diagram for explaining how the engine operating point is determined while the first electric motor and the second electric motor are not actuated, in the vehicle drive device of FIG. 1.

FIG. 4 is a diagram for explaining how the operating point of the engine 12 (hereinafter referred to as the engine operating point) is determined while the first electric motor MG1 and the second electric motor MG2 are not actuated. As depicted in FIG. 4, a pump torque Tp is an input-side load torque generated in the pump impeller 16p depending on a speed ratio e (=Nt/Np) of the torque converter 16 and has relationship with the engine rotation speed Ne as indicated by, for example, a broken line L01, under a certain turbine rotation speed Nt. The relationship between the pump torque Tp and the engine rotation speed Ne (=Np) indicated by the broken line L01 is relationship satisfying an equation "$Tp=\tau \times Ne^2$" when expressed by using a capacity coefficient $\tau$ of the torque converter 16, which is a function of the speed ratio e. Therefore, as depicted in FIG. 4, when the engine rotation speed Ne is higher, the speed ratio e of the torque converter 16 is smaller, and when the engine rotation speed Ne is higher, the pump torque Tp is larger. On the other hand, an output torque Te of the engine 12 (hereinafter referred to as an engine torque Te) has relationship with the engine rotation speed Ne as indicated by, for example, a solid line L02, under a certain throttle valve opening degree $\theta_{TH}$ of an electronic throttle valve of the engine 12, and the solid line L02 intersects with the broken line L01. An intersection point P01 between the broken line L01 and the solid line L02 indicates a point of balance between the engine torque Te and the pump torque Tp and the intersection point P01 is defined as the engine operating point. Therefore, the engine operating point is passively determined based on the turbine rotation speed Nt and the throttle valve opening degree $\theta_{TH}$. In contrast, in this example, the engine operating point can arbitrarily be changed by providing the output control of the first electric motor MG1 without being constrained by the turbine rotation speed Nt. This can be described with reference to FIG. 5.

Figure 5:
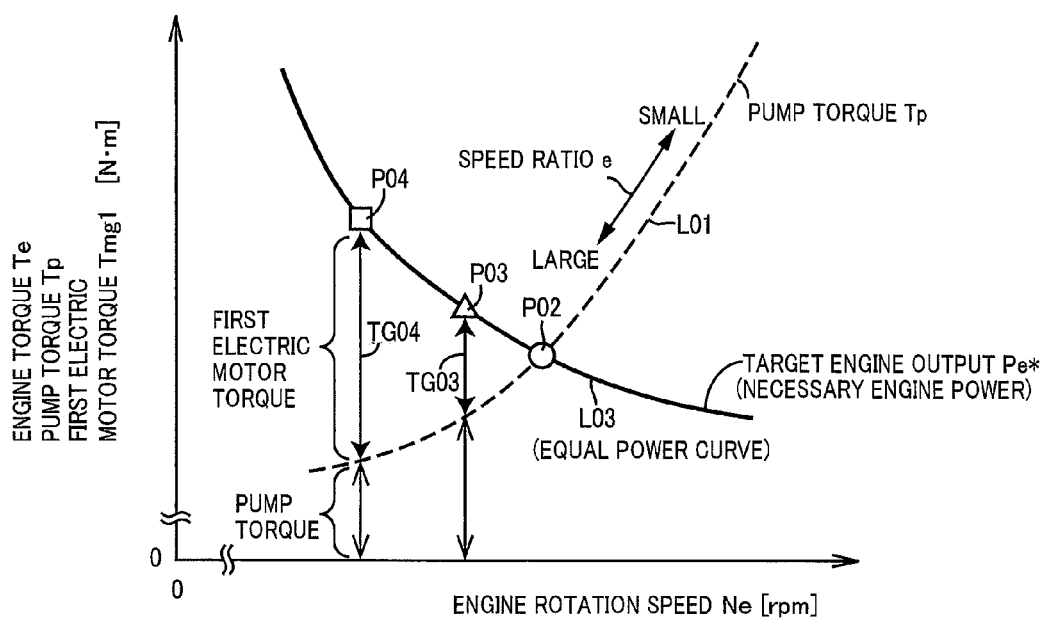
FIG. 5 is a diagram for explaining that the engine operating point can arbitrarily be changed by controlling the first electric motor, in the vehicle drive device of FIG. 1.

FIG. 5 is a diagram for explaining that the engine operating point can arbitrarily be changed by controlling the first electric motor MG1. In FIG. 5, the reference numerals in common with FIG. 4 denote the same elements as each other and the turbine rotation speed Nt is assumed to be the same as FIG. 4. A solid line L03 of FIG. 5 is an equal power curve indicative of relationship between the engine rotation speed Ne and the engine torque Te when a necessary engine power Pe*, i.e., a target engine output Pe* defined as a target value of an engine output Pe (e.g., in kW) is set to a certain value and control is provided such that the engine output Pe converges to the target engine output Pe*. FIG. 5 depicts an example when the engine operating point is arbitrarily set on the equal power curve (solid line L03). In FIG. 5, when the relationship between the pump torque Tp and the engine rotation speed Ne is indicated by the broken line L01 and the engine output Pe is set to the target engine output Pe* indicated by the solid line L03, if an output torque Tmg1 of the first electric motor MG1 (hereinafter referred to as first electric motor torque Tmg1) is not generated, the engine operating point is a point P02; if the first electric motor MG1 is operated for electric generation and the first electric motor torque Tmg1 of TG03 is generated in the negative rotation direction, the engine operating point is a point P03; and if the absolute value of the first electric motor torque Tmg1 is raised and the first electric motor torque Tmg1 of TG04 is generated in the negative rotation direction, the engine operating point is a point P04. In short, in the vehicle drive device 10 of this example, the first electric motor torque Tmg1 can be adjusted such that the sum of the engine torque Te and the first electric motor torque Tmg1 is balanced with the pump torque Tp, i.e., such that the relationship of "Tp=Te+Tmg1 (Tmg1 of FIG. 5 is a negative value)" is satisfied, so as to arbitrarily change the engine operating point without being constrained by the turbine rotation speed Nt. If the first electric motor MG1 is operated for electric generation, electric power generated by the first electric motor MG1 may be stored in the electric storage device 36; however, the electric power is basically supplied to the second electric motor MG2 and the second electric motor MG2 is driven. Therefore, the vehicle drive device 10 includes two power transmission paths, i.e., an electric path through which power (e.g., in kW) is electrically transmitted by giving/receiving electric power between the first electric motor MG1 and the second electric motor MG2 and a mechanical path through which power is mechanically transmitted via the torque converter 16, in parallel with each other between the engine 12 and the drive wheels 26. Since the engine operating point can continuously be changed by adjusting the first electric motor torque Tmg1 without being constrained by the turbine rotation speed Nt as described above, the first electric motor MG1, the second electric motor MG2, and the torque converter 16 can perform continuously variable transmission operation in which a gear ratio (=Ne/Nt) is changed in a substantially stepless manner as a whole and it can be said that a continuously variable transmission 60 is formed.

Figure 6:
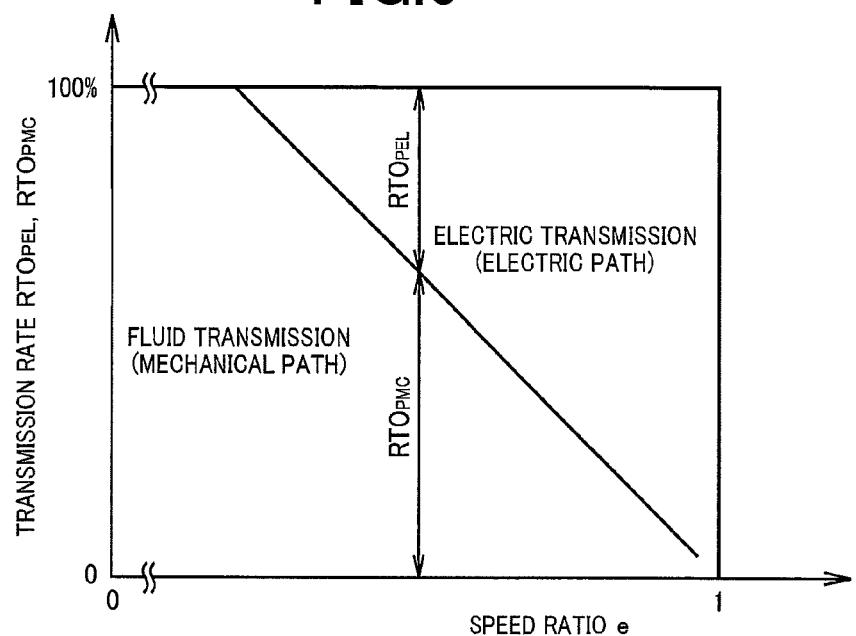
FIG. 6 is a conceptual diagram for explaining a proportion (transmission rate) of power transmitted through each of the electric path and the mechanical path when the engine operating point is changed under a certain target engine output, in the vehicle drive device of FIG. 1.

FIG. 6 is a conceptual diagram for explaining a proportion (transmission rate) of power transmitted through each of the electric path and the mechanical path when the engine operating point is changed under a certain target engine output Pe*. In FIG. 6, electric transmission represents that the power from the engine 12 is electrically transmitted, and therefore means the power transmission through the electric path, and fluid transmission represents that the power from the engine 12 is transmitted through fluid (the operating oil) in the torque converter 16, and therefore means the power transmission through the mechanical path. In FIG. 5, the output control of the first electric motor MG1 is provided such that the first electric motor torque Tmg1 increases in absolute value in the negative rotation direction as the engine rotation speed Ne becomes lower, i.e., the speed ratio e of the torque converter 16 becomes larger and, therefore, as depicted in FIG. 6, when the speed ratio e becomes larger toward one, a transmission rate $RTO_{PEL}$ of power through the electric transmission becomes larger while a transmission rate $RTO_{PMC}$ of power through the fluid transmission becomes smaller and, specifically, when the speed ratio e comes closer to one, the transmission rate $RTO_{PEL}$ of power through the electric transmission becomes closer to 100%. This tendency of change in the transmission rates $RTO_{PEL}$ and $RTO_{PMC}$ relative to the speed ratio e is the same regardless of the target engine output Pe* or the turbine rotation speed Nt.

Figure 7:
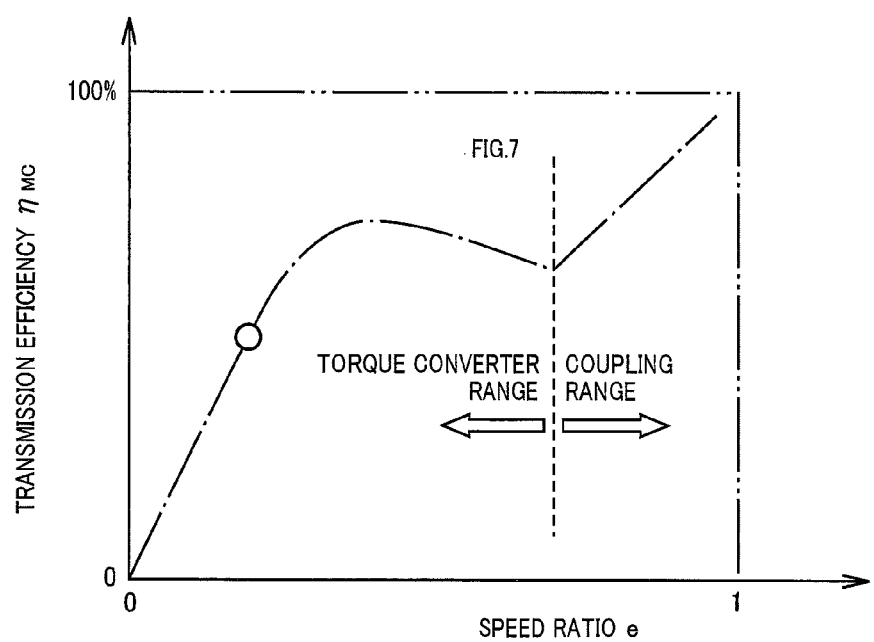
FIG. 7 is a diagram of a relationship between transmission efficiency of the torque converter only, i.e., transmission efficiency of the mechanical path and the speed ratio of the torque converter, in the vehicle drive device of FIG. 1.

Power transmission efficiency (=output power/input power; also simply referred to as transmission efficiency throughout the description) in the continuously variable transmission 60 made up of the first electric motor MG1, the second electric motor MG2, and the torque converter 16 will be described. First, transmission efficiency $\eta_{MC}$ of the torque converter 16 only, i.e., transmission efficiency $\eta_{MC}$ of the mechanical path, will be described with reference to FIG. 7. As depicted in FIG. 7, in a torque converter range on the side of a smaller speed ratio e, the transmission efficiency $\eta_{MC}$ of the torque converter 16 has a local maximum value at a predetermined speed ratio e and the transmission efficiency $\eta_{MC}$ becomes zero when the speed ratio e is zero. In a coupling range on the side of a larger speed ratio e, the transmission efficiency $\eta_{MC}$ becomes higher when the speed ratio e is larger, and the transmission efficiency $\eta_{MC}$ becomes highest when the speed ratio e is close to one in the torque converter range and the coupling range as a whole. Considering transmission efficiency $\eta_{EL}$ of the electric path and the transmission rates $RTO_{PEL}$ and $RTO_{PMC}$ depicted in FIG. 6 along with the transmission efficiency $\eta_{MC}$ of the torque converter 16, combined transmission efficiency $\eta_{CVT}$ can be obtained that is transmission efficiency in the case of transmitting the power from the engine 12 through the electric path and the mechanical path, i.e., the transmission efficiency $\eta_{CVT}$ of the entire continuously variable transmission 60.

Figure 8:
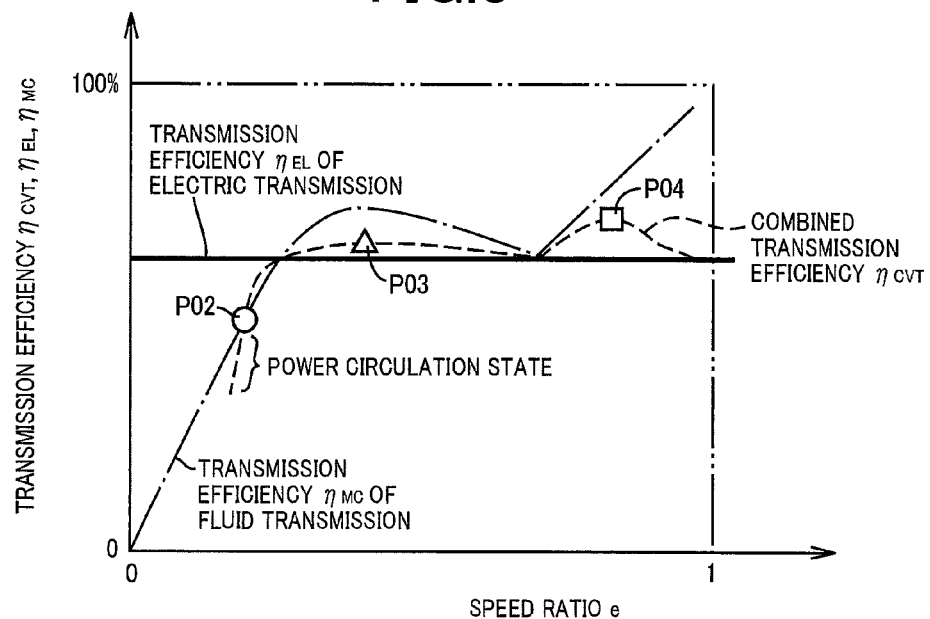
FIG. 8 is a diagram of a relationship between the combined transmission efficiency and the speed ratio of the torque converter, in the vehicle drive device of FIG. 1.

FIG. 8 is a diagram of relationship between the combined transmission efficiency $\eta_{CVT}$ and the speed ratio e of the torque converter 16 when it is assumed that the transmission efficiency $\eta_{EL}$ of the electric path is constant. In FIG. 8, a dashed-dotted line indicative of the transmission efficiency $\eta_{MC}$ of the mechanical path (fluid transmission) is the same as that of FIG. 7. As indicated by a solid line of FIG. 8, the transmission efficiency $\eta_{EL}$ of the electric path (electric transmission) is almost unchanged even when the speed ratio e of the torque converter 16 is changed, as compared to the transmission efficiency $\eta_{MC}$ of the mechanical path (fluid transmission). If the power from the engine 12 is transmitted through both the mechanical path and the electric path at the transmission rates $RTO_{PEL}$ and $RTO_{PMC}$ as depicted in FIG. 6 depending on the speed ratio e, the combined transmission efficiency $\eta_{CVT}$ is changed as indicated by a broken line in accordance with the speed ratio e. The points P02, P03, and P04 of FIG. 8 are the points P02, P03, and P04, respectively, of FIG. 5 expressed on the coordinate system of FIG. 8 and, in the case of FIG. 8, the combined transmission efficiency $\eta_{CVT}$ becomes highest at the speed ratio e indicated by the point P04 among the three points P02, P03, and P04. In FIG. 8, in a range of the speed ratio e lower than the speed ratio e indicated by the point P02, the combined transmission efficiency $\eta_{CVT}$ indicated by a broken line is significantly reduced lower than the transmission efficiency $\eta_{MC}$ of the mechanical path, and this is because the electric power transmission state between the first electric motor MG1 and the second electric motor MG2 turns to a power circulation state in which the first electric motor MG1 consumes electric power while the second electric motor MG2 generates electricity, or in other words, a power circulation state in which power is electrically transmitted from the second electric motor MG2 to the first electric motor MG1.

Since the vehicle drive device 10 can continuously change the engine operating point by adjusting the first electric motor torque Tmg1 without being constrained by the turbine rotation speed Nt as described above, this example utilizes this function, i.e., the continuously variable transmission function of the continuously variable transmission 60, to provide control for efficiently activating the engine 12 and, moreover, for allowing the vehicle drive device 10 including the engine 12 to efficiently operate as a whole. A main portion of the control function will hereinafter be described.

Returning to FIG. 3, as depicted in FIG. 3, the electronic control device 40 includes an operation mode determining means, i.e., an operation mode determining portion 70, and an engine operating point control means, i.e., an engine operating point control portion 72.

The operation mode determining portion 70 determines whether a predetermined system optimum operation mode is selected. For example, if an operation mode switch is turned on that is switched on when a driver selects the system optimum operation mode, the operation mode determining portion 70 determines that the system optimum operation mode is selected. The system optimum operation mode, is an operation mode for achieving efficiency improvement in the engine 12 and the continuously variable transmission 60 as a whole rather than efficiently activating only the engine 12, and is selected when it is desired to give very high priority to the fuel efficiency improvement, for example. The system optimum operation mode may automatically be selected, for example, when the accelerator opening degree Acc is almost unchanged, instead of depending on switching of the operation mode switch.

Figure 9:
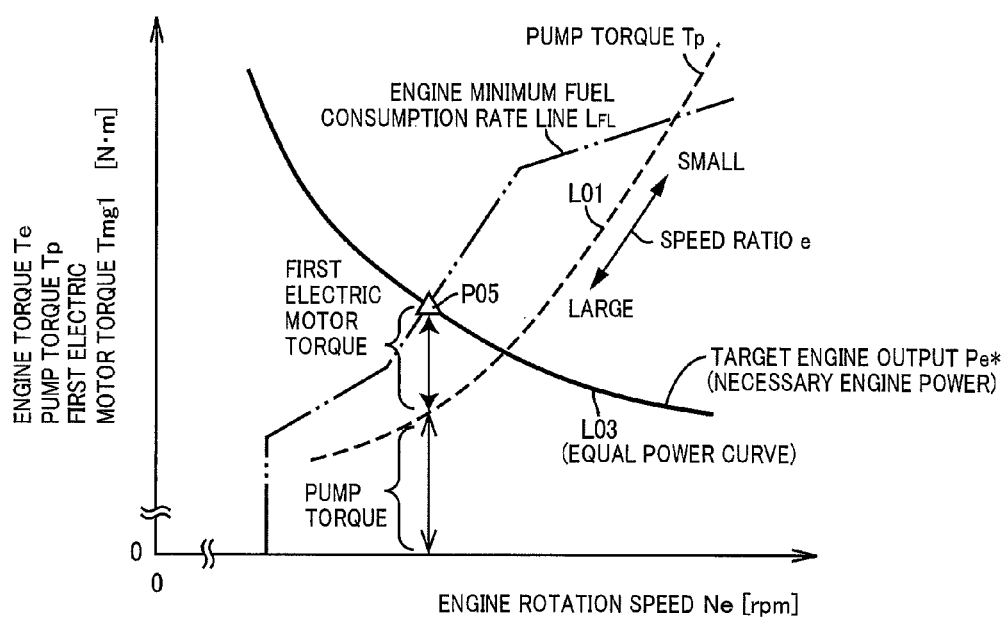
FIG. 9 is a diagram of the first electric motor torque and the pump torque when an operating point on the engine minimum fuel consumption rate line is defined as the target engine operating point in the coordinate system same as FIG. 5 under a certain turbine rotation speed.

The engine operating point control portion 72 provides the engine operating point control in which the first electric motor torque Tmg1 is adjusted to control the engine operating point during the engine running. When the first electric motor torque Tmg1 is adjusted, specifically, as depicted in FIG. 5, the first electric motor torque Tmg1 is adjusted such that the sum of the engine torque Te and the first electric motor torque Tmg1 is balanced with the pump torque Tp of the torque converter 16. Since the engine operating point control portion 72 basically causes the first electric motor MG1 to perform the electric generation operation in the engine operating point control, the first electric motor torque Tmg1 is a negative value except the power circulation state. Specifically describing the engine operating point control, first, the engine operating point control portion 72 sequentially determines the target engine operating point as an engine operating point P05 at which the target engine output Pe* is achieved on an engine minimum fuel consumption rate line $L_{FL}$ determined in advance as depicted in FIG. 9. FIG. 9 is a diagram of the first electric motor torque Tmg1 and the pump torque Tp when an operating point on the engine minimum fuel consumption rate line $L_{FL}$ is defined as the target engine operating point in the coordinate system same as FIG. 5 under a certain turbine rotation speed Nt, and the broken line L01 and the solid line L03 of FIG. 9 are the same as those of FIG. 5. The engine minimum fuel consumption rate line $L_{FL}$ is an operating curve of the engine 12 indicative of relationship between the engine rotation speed Ne and the engine torque Te empirically determined in advance such that the fuel consumption rate of the engine 12 is minimized, or in other words, is a series of fuel efficiency optimum points that are operating points optimal for the fuel efficiency improvement of the engine 12. The target engine output (necessary engine power) Pe* is an output requested by a driver to a vehicle and is sequentially determined by the engine operating point control portion 72 based on the accelerator opening degree Acc and the vehicle speed V from relationship empirically determined in advance so as to accommodate the output request from the driver and, for example, the target engine output Pe* is determined to be larger when the accelerator opening degree Acc is larger. If the charge remaining amount SOC of the electric storage device 36 is reduced to a predetermined lower limit value or lower, a charge request is made to indicate that the electric storage device 36 should be charged and, preferably, for the target engine output Pe*, an electric power based on the charge request (required charging power) is added to a calculation value based on the accelerator opening degree Acc and the vehicle speed V.

After determining the target engine operating point (point P05) on the engine minimum fuel consumption rate line $L_{FL}$ as described above, the engine operating point control portion 72 calculates the pump torque Tp based on the engine rotation speed Ne indicated by the point P05 and calculates the first electric motor torque Tmg1 based on the pump torque Tp and the engine torque Te indicated by the point P05 as depicted in FIG. 9. The engine operating point control portion 72 then calculates the speed ratio e of the torque converter 16 from the engine rotation speed Ne indicated by the point P05 and the turbine rotation speed Nt.

After calculating the pump torque Tp and the first electric motor torque Tmg1 based on the target engine operating point (point P05) on the engine minimum fuel consumption rate line $L_{FL}$, since the transmission rate $RTO_{PMC}$ of the mechanical path and the transmission rate $RTO_{PEL}$ of the electric path are respectively obtained from the mechanical path output transmitted through the mechanical path and the electric path output transmitted through the electric path, the engine operating point control portion 72 can calculate the combined transmission efficiency $\eta_{CVT}$ based on the speed ratio e and the transmission rates $RTO_{PEL}$ and $RTO_{PMC}$ from the relationship between the speed ratio e and the transmission efficiency $\eta_{MC}$ of the mechanical path empirically obtained and set in advance and the relationship between the speed ratio e and the transmission efficiency $\eta_{EL}$ of the electric path empirically obtained and set in advance, as depicted in FIG. 8. Therefore, the engine operating point control portion 72 sequentially calculates the combined transmission efficiency $\eta_{CVT}$.

Along with the calculation of the combined transmission efficiency $\eta_{CVT}$, the engine operating point control portion 72 sequentially calculates engine efficiency $\eta_{ENG}$ based on the engine rotation speed Ne and the engine torque Te indicated by the target engine operating point (point P05) on the engine minimum fuel consumption rate line $L_{FL}$, from a relationship (engine efficiency map) empirically obtained and determined in advance between the engine operating point, which is indicated by the engine rotation speed Ne and the engine torque Te, and the engine efficiency $\eta_{ENG}$. The engine operating point control portion 72 also sequentially calculates combined efficiency $\eta_{TOTAL}$, i.e., total efficiency $\eta_{TOTAL}$, acquired as the product of the calculated combined transmission efficiency $\eta_{CVT}$ and the engine efficiency $\eta_{ENG}$. The engine efficiency $\eta_{ENG}$ is a proportion of heat quantity of a lower heating value converted into work when fuel supplied to the engine 12 is completely combusted.

The engine operating point control portion 72 switches details of control in the engine operating point control depending on determination of the operation mode determining portion 70. Specifically, if the operation mode determining portion 70 determines that the system optimum operation mode is selected, the engine operating point control portion 72 shifts the engine operating point to the side of greater total efficiency $\eta_{TOTAL}$ that is the product of the combined transmission efficiency $\eta_{CVT}$ and the engine efficiency $\eta_{ENG}$.

For example, when shifting the target engine operating point to the side of greater total efficiency $\eta_{TOTAL}$ as described above, the engine operating point control portion 72 gradually shifts the target engine operating point on the equal power curve (e.g., the solid line L03 of FIG. 9) indicative of the target engine output Pe* and sequentially calculates the first electric motor torque Tmg1 as well as the total efficiency $\eta_{TOTAL}$, based on the target engine operating point each time the target engine operating point is shifted. The target engine operating point at the local maximum (preferably the maximum) of the total efficiency $\eta_{TOTAL}$ is determined as the final target engine operating point.

On the other hand, if the operation mode determining portion 70 determines that the system optimum operation mode is not selected, the engine operating point control portion 72 does not shift the target engine operating point to the side of greater total efficiency $\eta_{TOTAL}$ from the engine minimum fuel consumption rate line $L_{FL}$ as described above and determines the target engine operating point on the engine minimum fuel consumption rate line $L_{FL}$ (point P05 of FIG. 9) as the final target engine operating point.

If the operation mode determining portion 70 determines that the system optimum operation mode is selected or that the system optimum operation mode is not selected, when the final target engine operating point is determined, the engine operating point control portion 72 sequentially sets the engine rotation speed Ne and the engine torque Te indicated by the final target engine operating point as target values, i.e., a target engine rotation speed Ne* and a target engine torque Te*, respectively, and also sequentially sets the first electric motor torque Tmg1 and the first electric motor rotation speed Nmg1 (=engine rotation speed Ne) corresponding to the final target engine operating point as target values, i.e., a target first electric motor torque Tmg1* and a target first electric motor rotation speed Nmg1*, respectively. The engine operating point control portion 72 adjusts the throttle valve opening degree $\theta_{TH}$ to provide the output control of the engine 12 such that the actual engine torque Te matches, for example, follows, the target engine torque Te* and also controls the first electric motor MG1 such that the actual first electric motor torque Tmg1 matches (follows) the target first electric motor torque Tmg1* and that the actual first electric motor rotation speed Nmg1 matches (follows) the target first electric motor rotation speed Nmg1*. As described above, the engine operating point control portion 72 provides the engine operating point control.

Matching the actual first electric motor rotation speed Nmg1 with the target first electric motor rotation speed Nmg1* corresponds to matching the actual engine rotation speed Ne with the target engine rotation speed Ne*.

The engine operating point control portion 72 transmits an output torque Tmg2 of the second electric motor MG2 (hereinafter referred to as second electric motor torque Tmg2) to the drive wheels 26 in the engine operating point control. Although the engine operating point control portion 72 basically supplies electric power generated by the first electric motor MG1 directly to the second electric motor MG2 to drive the second electric motor MG2 in this case, if the charge request is made, the engine operating point control portion 72 calculates the target engine output Pe* made larger by the required charging power to be stored in the electric storage device 36 in accordance with the charge request and supplies to the second electric motor MG2 a remaining portion of the electric power generated by the first electric motor MG1 after subtracting the electric power to be stored into the electric storage device 36, thereby driving the second electric motor MG2. Since the engine operating point control causes all or a portion of the electric power generated by the first electric motor MG1 to be consumed by the second electric motor MG2, the second electric motor torque Tmg2 is a torque corresponding to the first electric motor torque Tmg1 and, if the consumed electric power in the second electric motor MG2 is suppressed, the first electric motor torque Tmg1 is indirectly suppressed in this relationship. Therefore, in the engine operating point control, the adjustment of the first electric motor torque Tmg1 may be considered as the adjustment of the power transmitted through the electric path and as the adjustment of the second electric motor torque Tmg2.

Figure 10:
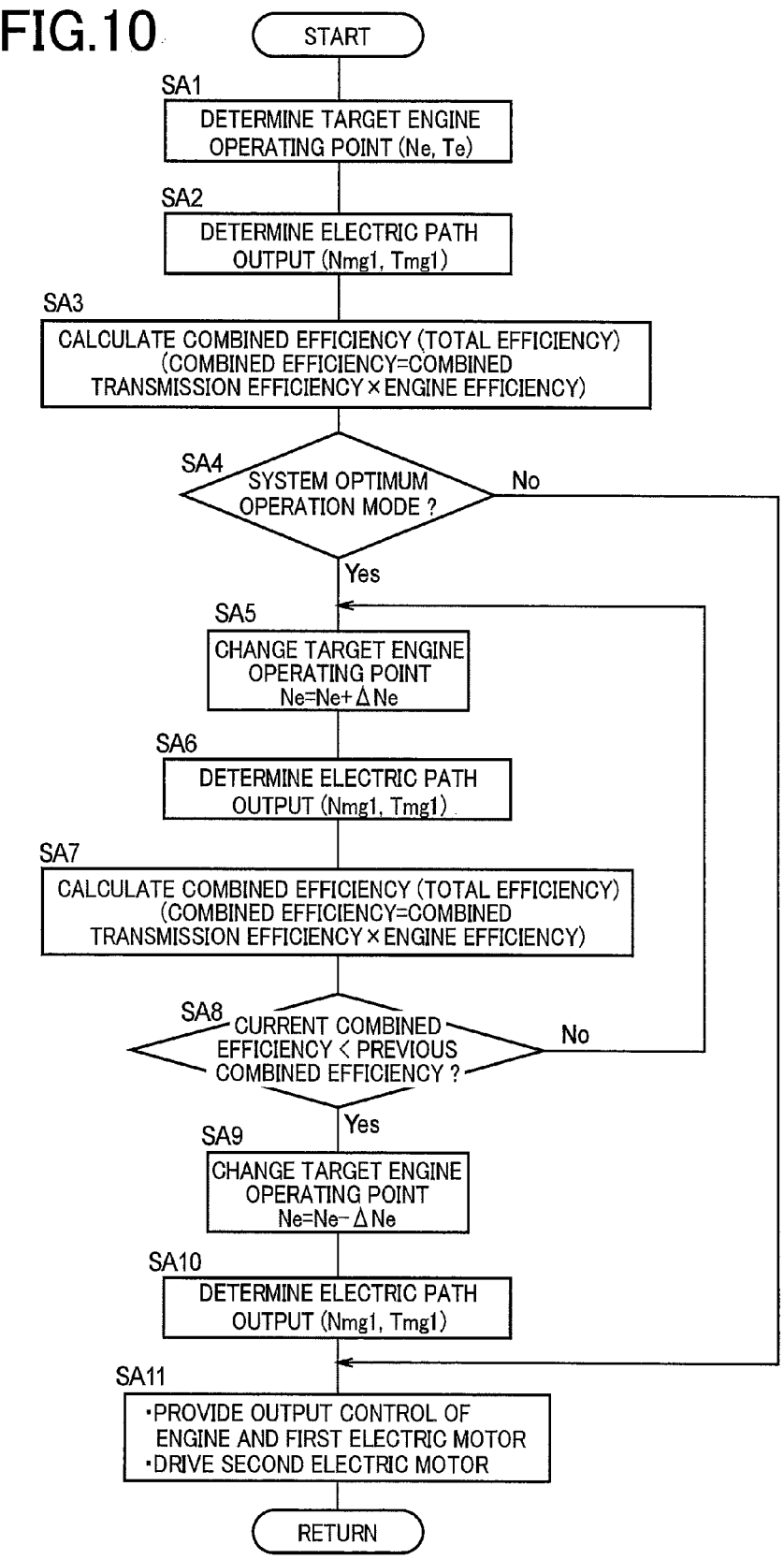
FIG. 10 is a flowchart for explaining a main portion of the control operation of the electronic control device of FIG. 3, i.e., the control operation of determining the engine operating point by utilizing the continuously variable transmission operation of the continuously variable transmission.

FIG. 10 is a flowchart for explaining a main portion of the control operation of the electronic control device 40, i.e., the control operation of determining the engine operating point by utilizing the continuously variable transmission operation of the continuously variable transmission 60 and is repeatedly executed with an extremely short cycle time, for example, on the order of a few msec to a few tens of msec. The control operation depicted in FIG. 10 is performed solely or concurrently with another control operation. Steps (hereinafter, "step" will be omitted) SA1 to SA3 and SA5 to SA11 correspond to the engine operating point control portion 72 and SA4 corresponds to the operation mode determining portion 70.

First, at SA1, a target engine output (necessary engine power) Pe* is calculated based on the accelerator opening degree Acc and the vehicle speed V from a predetermined relationship. The target engine output Pe* may be calculated to be larger by the charging power if the electric storage device 36 is charged, or may be calculated to be smaller by the discharging power if the electric storage device 36 is discharged. At SA1, a target engine operating point is determined as an engine operating point (e.g., the point P05 of FIG. 9) at which the calculated target engine output Pe* is achieved on the engine minimum fuel consumption rate line $L_{FL}$ as depicted in FIG. 9. SA1 is followed by SA2.

At SA2, as exemplarily illustrated in FIG. 9, the first electric motor torque Tmg1 is calculated and determined based on the target engine operating point (e.g., the point P05) determined at SA1. In other words, electric path output (e.g., in kW) transmitted through the electric path corresponding to the target engine operating point is calculated based on the first electric motor torque Tmg1 and the first electric motor rotation speed Nmg1 (=engine rotation speed Ne). Mechanical path output (e.g., in kW) transmitted through the mechanical path corresponding to the target engine operating point is calculated based on the pump torque Tp and the pump rotation speed Np (=engine rotation speed Ne). SA2 is followed by SA3.

At SA3, the combined transmission efficiency $\eta_{CVT}$ based on the target engine operating point determined at SA1 is calculated from the relationship between each of the transmission efficiency $\eta_{MC}$ of the mechanical path and the transmission efficiency $\eta_{EL}$ of the electric path, and the speed ratio e as depicted in FIG. 8 based on the turbine rotation speed Nt detected by the turbine rotation speed sensor, the engine rotation speed Ne indicated by the target engine operating point, and the electric path output and the mechanical path output calculated at SA2. The engine efficiency $\eta_{ENG}$ based on the target engine operating point determined at SA1 is also calculated. The product of the combined transmission efficiency $\eta_{CVT}$ and the engine efficiency $\eta_{ENG}$ is calculated as the total efficiency (combined efficiency) $\eta_{TOTAL}$. SA3 is followed by SA4.

At SA4, it is determined whether the system optimum operation mode is selected. If the determination at SA4 is affirmative, i.e., if the system optimum operation mode is selected, the operation goes to SA5. On the other hand, if the determination at SA4 is negative, the operation goes to SA11.

At SA5, the engine rotation speed Ne indicated by the target engine operating point is increased by a predetermined change amount ΔNe to determine a new target engine operating point. This stepwise change in the target engine operating point is made such that the target engine output Pe* calculated at SA1 is not changed. Therefore, the engine torque Te indicated by the target engine operating point is changed along with the change in the engine rotation speed Ne indicated by the target engine operating point. The target engine operating point before the change at SA5 is referred to as a previous target engine operating point and the target engine operating point after the change is referred to as a current target engine operating point. SA5 is followed by SA6.

At SA6, as is the case with SA2, the first electric motor torque Tmg1 is calculated based on the current target engine operating point, and the electric path output and the mechanical path output corresponding to the current target engine operating point are calculated. SA6 is followed by SA7.

At SA7, as is the case with SA3, the combined transmission efficiency $\eta_{CVT}$ based on the current target engine operating point is calculated and the engine efficiency $\eta_{ENG}$ based on the current target engine operating point is calculated. The product of the combined transmission efficiency $\eta_{CVT}$ and the engine efficiency $\eta_{ENG}$ is calculated as the total efficiency (combined efficiency) $\eta_{TOTAL}$ (referred to as current combined efficiency). Previous combined efficiency is the total efficiency (combined efficiency) $\eta_{TOTAL}$ based on the previous target engine operating point and is stored in advance for determination at SA8. SA7 is followed by SA8.

At SA8, it is determined whether the previous combined efficiency is greater than the current combined efficiency. If the determination at SA8 is affirmative, i.e., if the previous combined efficiency is greater than the current combined efficiency, the operation goes to SA9. On the other hand, if the determination at SA8 is negative, the operation goes to SA5.

At SA9, the target engine operating point is returned to the previous target engine operating point. In other words, the engine rotation speed Ne indicated by the current target engine operating point determined at SA5 is reduced by the predetermined change amount ΔNe to determine a new target engine operating point. In this case, as is the case with SA5, the engine torque Te indicated by the target engine operating point is also changed, i.e., returned to the previous torque, such that the target engine output Pe* is not changed. SA9 is followed by SA10.

At SA10, as is the case with SA2, the first electric motor torque Tmg1 is calculated based on the target engine operating point newly determined at SA9, and the electric path output and the mechanical path output corresponding to the target engine operating point newly determined at SA9 are calculated. SA10 is followed by SA11.

At SA11, the output control of the engine 12 and the first electric motor MG1 is provided such that an actual operating point of the engine 12 indicated by the actual engine rotation speed Ne and engine torque Te matches, for example, follows, the finally determined target engine operating point. The second electric motor torque Tmg2 is transmitted to the drive wheels 26. Although the electric power generated by the first electric motor MG1 is directly supplied to the second electric motor MG2 to drive the second electric motor MG2 in this case, if the electric storage device 36 is charged, the second electric motor MG2 is supplied with a remaining portion of the electric power generated by the first electric motor MG1 after subtracting the electric power to be stored into the electric storage device 36, so as to drive the second electric motor MG2.

This example has the following effects (A1) to (A4). (A1) According to this example, the first electric motor MG1, the second electric motor MG2, and the torque converter 16 make up the continuously variable transmission 60 as a whole and the engine operating point control portion 72 provides the engine operating point control in which the first electric motor torque Tmg1 is adjusted to control the engine operating point during the engine running. In the engine operating point control, the second electric motor torque Tmg2 is transmitted to the drive wheels 26. Therefore, since the continuously variable transmission operation of the continuously variable transmission 60 can be performed by adjusting the first electric motor torque Tmg1 (basically, regenerative torque) and the continuously variable transmission operation of the continuously variable transmission 60 enables the engine operating point to be controlled without being constrained by the turbine rotation speed Nt, the engine 12 can be driven at an operating point optimal for the fuel efficiency improvement (fuel efficiency optimum point), for example, and the vehicle fuel efficiency can be improved.

(A2) According to this example, as depicted in FIG. 5, the engine operating point control portion 72 adjusts the first electric motor torque Tmg1 such that the sum of the engine torque Te and the first electric motor torque Tmg1 is balanced with the pump torque Tp that is the input-side load torque of the torque converter 16. Therefore, the first electric motor torque Tmg1 can easily be adjusted based on the characteristics of the torque converter 16.

(A3) According to this example, if the operation mode determining portion 70 determines that the system optimum operation mode is selected, the engine operating point control portion 72 shifts the engine operating point to the side of greater total efficiency $\eta_{TOTAL}$ that is the product of the combined transmission efficiency $\eta_{CVT}$ and the engine efficiency $\eta_{ENG}$. Therefore, as compared to the case that the engine operating point is not changed depending on the total efficiency $\eta_{TOTAL}$, the efficiency of the vehicle drive device 10 is increased as a whole and the vehicle fuel efficiency can be improved.

(A4) According to this example, if the operation mode determining portion 70 determines that the system optimum operation mode is not selected, the engine operating point control portion 72 controls the engine operating point such that the engine operating point is located along the engine minimum fuel consumption rate line $L_{FL}$ and that the target engine output Pe* is achieved. Therefore, a rise in the fuel consumption rate of the engine 12 can be suppressed by the continuously variable transmission operation of the continuously variable transmission 60.

As described above, since the vehicle drive device 10 of this example adjusts the first electric motor torque Tmg1 to provide the engine operating point control while using both the electric path and the mechanical path as the transmission path transmitting the power of the engine 12, the vehicle fuel efficiency can be improved. When an apparatus such as the automatic transmission 18 is not yet warmed up, certain control may need to be inhibited or limited until warmed-up and, therefore, it may be desired to give priority to promotion of warm-up of the apparatus such as the automatic transmission 18 over the fuel efficiency improvement.

Since the vehicle drive device 10 of this example can adjust the first electric motor torque Tmg1 to provide the engine operating point control, it is proposed to utilize this fact to promote the warm-up of the apparatus such as the automatic transmission 18.

As depicted in FIG. 7, although having a local maximum value relative to the speed ratio e, the transmission efficiency $\eta_{MC}$ of the torque converter 16 tends to decrease as the speed ratio e decreases on the whole. In other words, a power transmission loss $LSS_{MC}$ of the torque converter 16 tends to increase as the speed ratio e decreases. Since the speed ratio e of the torque converter 16 can be changed by adjusting the first electric motor torque Tmg1, the vehicle drive device 10 can reduce the speed ratio e to increase the power transmission loss $LSS_{MC}$ of the torque converter 16. Since a heat generation amount of the operating oil in the torque converter 16 can be increased in this way, the vehicle drive device 10 can promote a rise in the operating oil temperature THoil to promote the warm-up of the apparatus, for example, the automatic transmission 18, actuated by the same operating oil as the operating oil actuating the torque converter 16.

Figure 11:
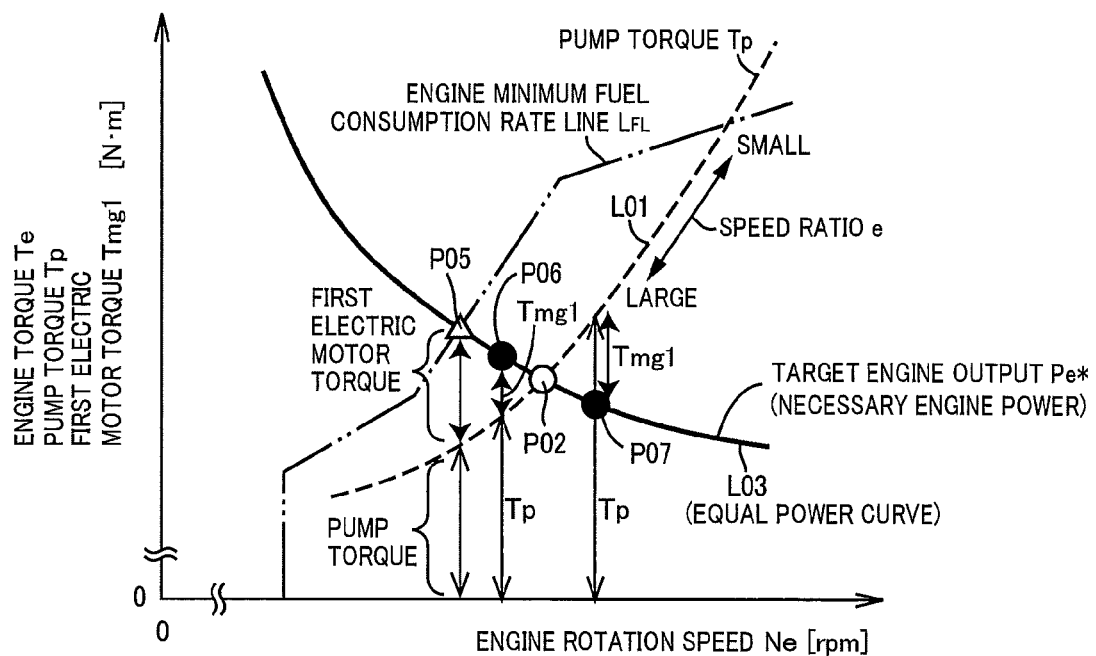
FIG. 11 is a diagram for explaining the target engine operating point set when the operating oil temperature is relatively lower in the diagram same as FIG. 9.

Specifically, if the operating oil temperature THoil is lower, the electronic control device 40 adjusts the first electric motor torque Tmg1 while giving/receiving electric power between the first electric motor MG1 and the second electric motor MG2, so as to reduce the speed ratio e of the torque converter 16 as compared to when the operating oil temperature THoil is higher. The forms of reducing the speed ratio e of the torque converter 16 can roughly be classified into two forms. FIG. 11 is a diagram for explaining the target engine operating point set when the operating oil temperature THoil is relatively lower in the diagram same as FIG. 9. In FIG. 11, to reduce the speed ratio e of the torque converter 16 as compare to the engine operating point P05 at which the target engine output Pe* is achieved on the engine minimum fuel consumption rate line $L_{FL}$, the regenerative torque of the first electric motor MG1 may be reduced and the engine rotation speed Ne may be increased as indicated by an engine operating point P06 relative to the engine operating point P05. Since the warm-up is more promoted as the speed ratio e of the torque converter 16 is further reduced, it is contemplated that when the operating oil temperature THoil is lower, the speed ratio e of the torque converter 16 may be further reduced, i.e., the engine rotation speed Ne may be more increased. Therefore, the target engine operating point may be set to an engine operating point P07 at which the engine rotation speed Ne is more increased as compared to the engine operating point P06 in some cases. At the engine operating point P07, the engine rotation speed Ne is on the higher rotation side relative to the engine operating point P02 at which the engine torque Te is balanced with the pump torque Tp, and the control to the engine operating point P07 through the engine operating point control requires a power running torque of the first electric motor MG1, i.e., a positive value of the first electric motor torque Tmg1. In other words, to reduce the speed ratio e of the torque converter 16 as compared to the engine operating point P02, the power running torque of the first electric motor MG1 may be increased to raise the engine rotation speed Ne relative to the engine operating point P02 as indicated by the engine operating point P07. Therefore, if warm-up is required, the engine operating point P06 or the engine operating point P07 corresponding to the operating oil temperature THoil may be set as the target engine operating point, instead of the engine operating point P05. The forms of reducing the speed ratio e of the torque converter 16 can roughly be classified into two forms, i.e., a form of setting the target engine operating point to the engine operating point P06, for example, and a form of setting the target engine operating point to the engine operating point P07, for example. Particularly, since the power circulation state is achieved in the form of setting the target engine operating point to, for example, the engine operating point P07, the warm-up is more easily promoted by an increase in loss due to the power circulation state.

Figure 12:
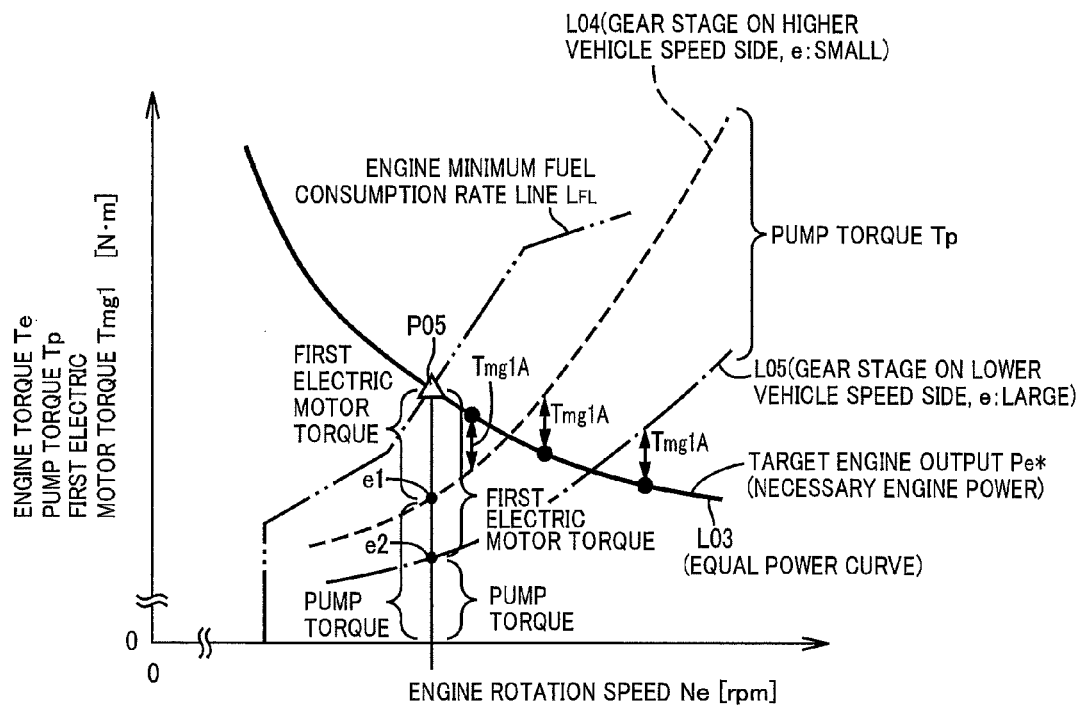
FIG. 12 is a diagram of the first electric motor torque and the pump torque for each gear stage of the automatic transmission when the operating point on the engine minimum fuel consumption rate line is defined as the target engine operating point in the same coordinate system as FIG. 9 under a certain vehicle speed.
Figure 13:
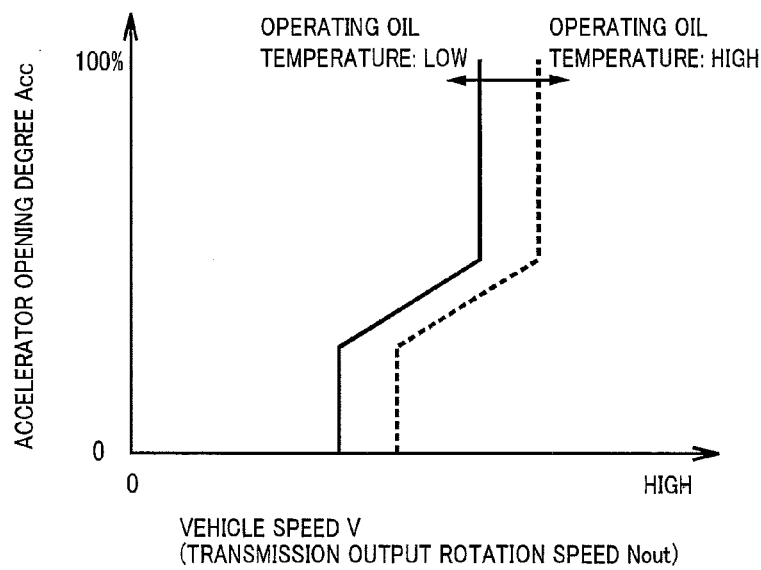
FIG. 13 is a diagram of a portion of a shift map, depicting an upshift line between certain gear stages changed depending on the operating oil temperature.

Since the automatic transmission 18 is included, the vehicle drive device 10 of this example can utilize automatic transmission 18 to promote the warm-up of the apparatus such as the automatic transmission 18. FIG. 12 is a diagram of the first electric motor torque Tmg1 and the pump torque Tp for each gear stage of the automatic transmission 18 when the operating point P05 on the engine minimum fuel consumption rate line $L_{FL}$ is defined as the target engine operating point in the same coordinate system as FIG. 9 under a certain vehicle speed V, and the solid line L03, the engine minimum fuel consumption rate line $L_{FL}$, and the point P05 of FIG. 12 are the same as those of FIG. 9. In FIG. 12, both a broken line L04 and a dashed-dotted line L05 are curves representative of relationship between the pump torque Tp and the engine rotation speed Ne, and the broken line L04 represents the case that the gear stage of the automatic transmission 18 is a gear stage on the higher vehicle speed side as compared to the dashed-dotted line L05. When the gear stage of the automatic transmission 18 is on the higher vehicle speed side, the turbine rotation speed Nt becomes lower and results in the lower speed ratio e of the torque converter 16 and, therefore, if the target engine operating point is set to the operating point P05, a speed ratio e1 corresponding to the broken line L04 is made smaller than a speed ratio e2 corresponding to the dashed-dotted line L05. When the engine rotation speed Ne is increased through the engine operating point control, for example, if the form of setting to the engine operating point P07 is used, the broken line L04 results in a wider range of increasing the engine rotation speed Ne, for example, a wider range of the engine rotation speed Ne in which the power circulation state is achieved, as compared to the dashed-dotted line L05, and therefore enables further promotion of the warm-up. Thus, when the operating oil temperature THoil is lower, the electronic control device 40 may set the gear stage (gear ratio γat) of the automatic transmission 18 to a gear stage (gear ratio) on the higher vehicle speed side. FIG. 13 is a diagram of a portion of a shift map obtained and stored in advance, depicting an upshift line changed depending on the operating oil temperature THoil between certain gear stages. In FIG. 13, the upshift line is set on the lower vehicle speed side as indicated by a solid line when the operating oil temperature THoil is lower, and is set on the higher vehicle speed side as indicated by a broken line when the operating oil temperature THoil is higher. Therefore, when the operating oil temperature THoil is lower, the upshift line is changed to the lower vehicle speed side so as to advance an upshift of the automatic transmission 18.

Returning to FIG. 3, a shift control means, i.e., a shift control portion 74 performs a shift of the automatic transmission 18 based on the accelerator opening degree Acc and the vehicle speed V from a shift map having an upshift line changed depending on the operating oil temperature THoil as depicted in FIG. 13, for example.

A warm-up necessity determining means, i.e., a warm-up necessity determining portion 76 determines, for example, whether warm-up of the vehicle drive device 10 (e.g., the automatic transmission 18) is necessary, based on whether the operating oil temperature THoil is lower than a predetermined low oil temperature. The predetermined low oil temperature is a low-oil-temperature determination value obtained and stored in advance for judging that the operating oil temperature THoil is so low that the warm-up of the vehicle drive device 10 must be promoted instead of the fuel efficiency improvement, for example.

For example, if the warm-up necessity determining portion 76 determines that the warm-up of the vehicle drive device 10 is not necessary, the engine operating point control portion 72 determines the target engine operating point as an engine operating point at which the target engine output Pe* is achieved on the engine minimum fuel consumption rate line $L_{FL}$, or an engine operating point at which the total efficiency $\eta_{TOTAL}$, is maximized. The engine operating point control portion 72 provides the engine operating point control such that the determined target engine operating point is realized.

For example, if the warm-up necessity determining portion 76 determines that the warm-up of the vehicle drive device 10 is necessary, a warm-up time target operating point setting means, i.e., a warm-up time target operating point setting portion 78 sets a warm-up time target engine operating point that is the target operating point for promoting the warm-up. Specifically, the warm-up time target operating point setting portion 78 determines a target speed ratio e* based on the actual operating oil temperature THoil from a relationship (target speed ratio map) as depicted in, for example, FIG. 14, obtained and stored in advance such that the target speed ratio e* of the torque converter 16 becomes smaller so as to promote the warm-up when the operating oil temperature THoil is lower. The warm-up time target operating point setting portion 78 calculates the target engine rotation speed Ne* (=Nt/e*) based on the actual turbine rotation speed Nt from the determined target speed ratio e*. The warm-up time target operating point setting portion 78 calculates the target engine torque Te* at which the target engine output Pe* is achieved at the target engine rotation speed Ne*. The engine operating point indicated by the target engine rotation speed Ne* and the target engine torque Te* is the warm-up time target engine operating point. As described above, the warm-up time target operating point setting portion 78 sets the warm-up time target engine operating point to realize the target speed ratio e*.

Figure 15:
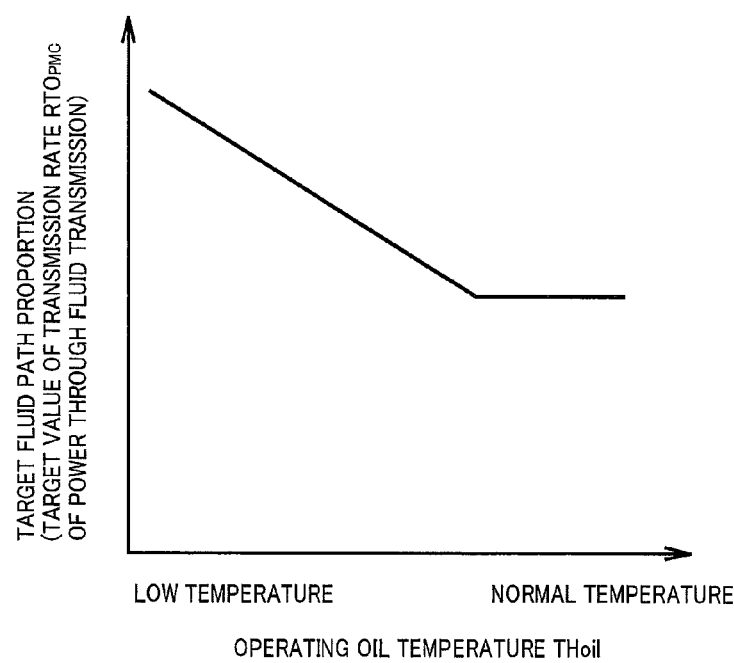
FIG. 15 is a diagram of an example of a target fluid path proportion map obtained and stored in advance such that the target fluid path proportion becomes larger so as to promote the warm-up when the operating oil temperature is lower, the map is used in place of FIG. 14.

As described above, when setting the warm-up time target engine operating point, the warm-up time target operating point setting portion 78 sets the target speed ratio e* corresponding to the operating oil temperature THoil. As depicted in FIG. 6, when the speed ratio e becomes smaller, the transmission rate $RTO_{PEL}$ of power through the electric transmission becomes smaller while the transmission rate $RTO_{PMC}$ of power through the fluid transmission becomes larger. In other words, the speed ratio e and the transmission rate $RTO_{PMC}$ of power through the fluid transmission are in one-to-one relationship. Therefore, from a relationship (target fluid path proportion map) as depicted in, for example, FIG. 15, obtained and stored in advance such that the target value of the transmission rate $RTO_{PMC}$ of power through the fluid transmission (hereinafter referred to as a target fluid path proportion $RTO_{PMC}$*) becomes larger so as to promote the warm-up when the operating oil temperature THoil is lower, the warm-up time target operating point setting portion 78 determines the target fluid path proportion $RTO_{PMC}$* based on the actual operating oil temperature THoil. The warm-up time target operating point setting portion 78 may set the target speed ratio e* at which the determined target fluid path proportion $RTO_{PMC}$* can be realized, from the relationship depicted in FIG. 6, for example.

A speed ratio changeability determining means, i.e., a speed ratio changeability determining portion 80 determines whether the respective ranges of rated outputs of the first electric motor MG1 and the second electric motor MG2 include the operating point of the first electric motor MG1 for realizing the warm-up time target engine operating point set by, for example, the warm-up time target operating point setting portion 78 (the target first electric motor torque Tmg1* and the target first electric motor rotation speed Nmg1*) and the operating point of the second electric motor MG2 based on giving/receiving of electric power between the first electric motor MG1 and the second electric motor MG2 (the second electric motor torque Tmg2 and the second electric motor rotation speed Nmg2). The rated outputs are respective maximum outputs (maximum capabilities) of the first electric motor MG1 and the second electric motor MG2 empirically obtained and set in advance to be allowed in the respective usage environments of the first electric motor MG1 and the second electric motor MG2, for example. For example, with regard to the rated outputs of the electric motors, as is well known, when an electric motor rotation speed Nmg is lower, an upper limit value of an allowable electric motor torque Tmg is made larger and, when an electric motor torque Tmg is smaller, an upper limit value of an allowable electric motor rotation speed Nmg is made higher.

If the speed ratio changeability determining portion 80 determines that at least one operating point of the first electric motor MG1 and the second electric motor MG2 is out of the respective ranges of rated outputs of the electric motors when the warm-up time target engine operating point is realized, the shift control portion 74 provides the shift control of the automatic transmission 18 such that the operating points of the first electric motor MG1 and the second electric motor MG2 fall within the respective ranges of rated outputs of the electric motors.

For example, if a certain first electric motor torque Tmg1 is required for moving the engine operating point in the engine operating point control, when the first electric motor rotation speed Nmg1 is higher on the rated output of the first electric motor MG1, the operating point of the first electric motor MG1 more easily goes out of the rated output. In other words, as depicted in FIG. 12, for example, if the same first electric motor torque Tmg1A (or first electric motor torque Tmg1B) is required, when the automatic transmission 18 is set to a gear stage on the lower vehicle speed side, the first electric motor rotation speed Nmg1 is higher and, therefore, the operating point of the first electric motor MG1 easily goes out of the rated output. Therefore, if the target first electric motor rotation speed Nmg1* is out of the range of rated output of the first electric motor MG1 at the target first electric motor torque Tmg1* when the warm-up time target engine operating point is realized, the shift control portion 74 performs an upshift of the automatic transmission 18. On the other hand, if a certain second electric motor power is required as power of the second electric motor MG2 (second electric motor power) at the operating point of the second electric motor MG2 based on giving/receiving of electric power between the first electric motor MG1 and the second electric motor MG2 for moving the engine operating point in the engine operating point control, when the second electric motor rotation speed Nmg2 is lower, the second electric motor torque Tmg2 is larger and, therefore, the operating point of the second electric motor MG2 on the rated output of the second electric motor MG2 more easily goes out of the rated output. Therefore, if the second electric motor torque Tmg2 for acquiring the second electric motor power in giving/receiving of electric power between the first electric motor MG1 and the second electric motor MG2 is out of the range of rated output of the second electric motor MG2 when the warm-up time target engine operating point is realized, the shift control portion 74 performs a downshift of the automatic transmission 18. As described above, if the speed ratio changeability determining portion 80 determines that at least one operating point of the first electric motor MG1 and the second electric motor MG2 is out of the respective ranges of rated outputs of the electric motors, the shift control portion 74 determines a gear stage of the automatic transmission 18 for setting the operating points of the electric motors within the respective ranges of rated outputs and provides the shift control of the automatic transmission 18 so as to achieve the determined gear stage.

Figure 16:
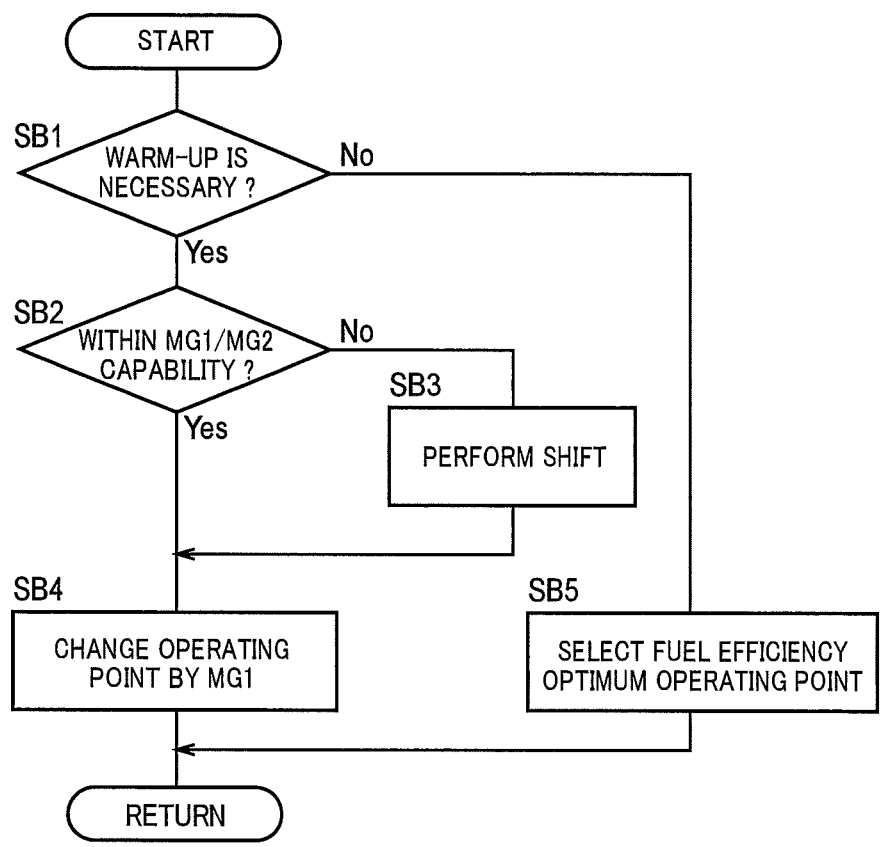
FIG. 16 is a flowchart for explaining a main portion of the control operation of the electronic control device of FIG. 3, i.e., the control operation of adjusting the first electric motor torque to control the engine operating point so as to promote the warm-up.

FIG. 16 is a flowchart for explaining a main portion of the control operation of the electronic control device 40, i.e., the control operation of adjusting the first electric motor torque Tmg1 to control the engine operating point so as to promote the warm-up and is repeatedly executed with an extremely short cycle time, for example, on the order of a few msec to a few tens of msec. The control operation depicted in FIG. 16 is performed solely or concurrently with another control operation. Steps (hereinafter, "step" will be omitted) SB1 corresponds to the warm-up necessity determining portion 76; SB2 corresponds to the warm-up time target operating point setting portion 78 and the speed ratio changeability determining portion 80; SB3 corresponds to the shift control portion 74; SB4 corresponds to the warm-up time target operating point setting portion 78 and the engine operating point control portion 72; and SB5 corresponds to the engine operating point control portion 72.

First, at SB1, it is determined whether warm-up of the automatic transmission 18 is necessary, based on whether the operating oil temperature THoil is lower than the predetermined low oil temperature. If the determination of SB1 is affirmative, i.e., if warm-up of the automatic transmission 18 is necessary, the operation goes to SB2. On the other hand, if the determination of SB1 is negative, i.e., if warm-up of the automatic transmission 18 is not necessary, the operation goes to SB5.

Figure 14:
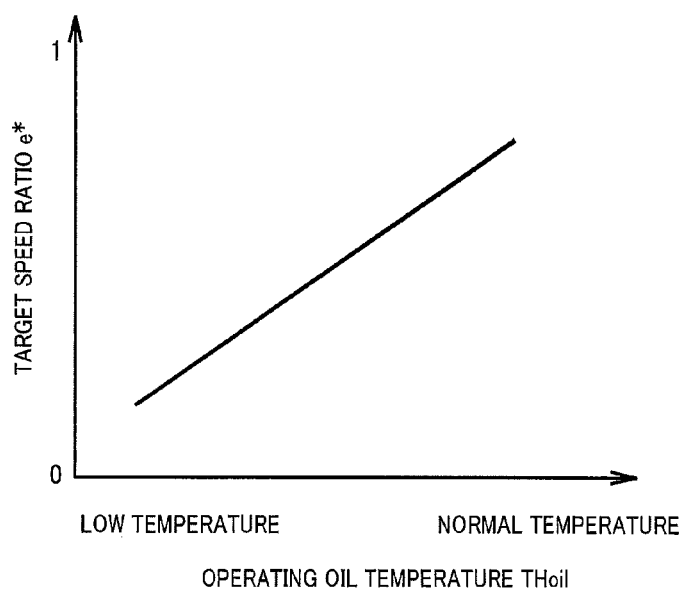
FIG. 14 is a diagram of an example of the target speed ratio map obtained and stored in advance such that the target speed ratio becomes smaller so as to promote the warm-up when the operating oil temperature is lower.

At SB2, the warm-up time target engine operating point is set to realize the target speed ratio e* determined based on the actual operating oil temperature THoil from the target speed ratio map as depicted in FIG. 14, for example. It is then determined whether the operating point of the first electric motor MG1 and the operating point of the second electric motor MG2 for realizing the set warm-up time target engine operating point are within the respective ranges of rated outputs of the first electric motor MG1 and the second electric motor MG2. If the determination of SB2 is affirmative, i.e., if the operating point of the first electric motor MG1 and the operating point of the second electric motor MG2 for realizing the warm-up time target engine operating point are within the respective ranges of rated outputs, the operation goes to SB4. On the other hand, if the determination of SB2 is negative, i.e., if at least one of the operating point of the first electric motor MG1 and the operating point of the second electric motor MG2 for realizing the warm-up time target engine operating point is out of the respective ranges of rated outputs, the operation goes to SB3.

At SB3, the gear stage of the automatic transmission 18 is determined for setting the operating points of the first electric motor MG1 and the second electric motor MG2 within the respective ranges of rated outputs of the electric motors, and the shift control of the automatic transmission 18 is provided to achieve the determined gear stage.

At SB4, the warm-up time target engine operating point at the current gear stage is set and the engine operating point control is provided by adjusting the first electric motor torque Tmg1 such that the set warm-up time target engine operating point is realized.

At SB5, for example, the target engine operating point is determined (selected) as an engine operating point at which the target engine output Pe* is achieved on the engine minimum fuel consumption rate line $L_{FL}$ or an engine operating point at which the total efficiency $\eta_{TOTAL}$ is maximized. The engine operating point control is provided such that the determined target engine operating point is realized. For example, the flowchart of FIG. 10 is performed.

As described above, according to this example, the engine operating point control can be provided by adjusting the first electric motor torque Tmg1 and when the operating oil temperature THoil is lower, the first electric motor torque Tmg1 is adjusted while giving/receiving electric power between the first electric motor MG1 and the second electric motor MG2 so as to reduce the speed ratio e of the torque converter 16 as compared to when the operating oil temperature THoil is higher and, therefore, the transmission loss in the torque converter 16 is increased to increase the heat generation amount. Thus, a rise in the operating oil temperature THoil can obviously be promoted, and the rise in the operating oil temperature THoil can promote warm-up of an apparatus (e.g., the automatic transmission 18) actuated by the operating oil. Since the adjustment of the first electric motor torque Tmg1 is performed by giving/receiving electric power between the first electric motor MG1 and the second electric motor MG2, the loss of the torque converter 16 can be increased regardless of the charged capacity SOC of the electric storage device 36 etc. Therefore, the warm-up can be promoted in a wider range without being limited by the charged capacity SOC of the electric storage device 36 etc.

According to this example, since the power running torque of the first electric motor MG1 is increased to raise the engine rotation speed Ne relative to the engine operating point at which the engine torque Te is balanced with the pump torque Tp, thereby setting the warm-up time target engine operating point so as to realize the target speed ratio e* set in advance to be smaller when the operating oil temperature THoil is lower, the transmission loss of the torque converter 16 is increased to increase the heat generation amount and the warm-up of the apparatus actuated by the operating oil can properly be promoted. Since the power circulation state is achieved in giving/receiving of the electric power between the first electric motor MG1 and the second electric motor MG2, an increase in loss is also expected from this state.

According to this example, since the regenerative torque of the first electric motor MG1 is reduced and the engine rotation speed Ne is increased relative to the engine operating point at which the target engine output Pe* is achieved on the engine minimum fuel consumption rate line $L_{FL}$, thereby setting the warm-up time target engine operating point so as to realize the target speed ratio e* set in advance to be smaller when the operating oil temperature THoil is lower, the transmission loss of the torque converter 16 is increased to increase the heat generation amount and the warm-up of the apparatus actuated by the operating oil can properly be promoted.

According to this example, since the operating oil is oil for actuating the automatic transmission 18, the warm-up of the automatic transmission 18 can be promoted by the torque converter 16.

According to this example, when the operating oil temperature THoil is lower, the gear ratio γat of the automatic transmission 18 is set to a gear ratio on the higher vehicle speed side and, therefore, a range of reducing the speed ratio e of the torque converter 16 (e.g., a range of increasing the engine rotation speed Ne) is expanded and the warm-up can further be promoted.

According to this example, when the speed ratio e of the torque converter 16 is reduced, if at least one operating point of the first electric motor MG1 and the second electric motor MG2 is out of the respective ranges of rated outputs of the electric motors, a shift of the automatic transmission 18 is performed such that the operating points are set within the ranges of the rated outputs and, therefore, the adjustment of the first electric motor torque Tmg1 can properly be performed by giving/receiving electric power between the first electric motor MG1 and the second electric motor MG2. Thus, the loss of the torque converter 16 can properly be increased regardless of the charged capacity SOC of the electric storage device 36 etc.

According to this example, if the first electric motor rotation speed Nmg1 is out of the range of the rated output at the first electric motor torque Tmg1 at the time of adjustment for reducing the speed ratio e of the torque converter 16, an upshift of the automatic transmission 18 is performed and, if the second electric motor torque Tmg2 for acquiring the second electric motor power in giving/receiving of electric power between the first electric motor MG1 and the second electric motor MG2 is out of the range of the rated output, a downshift of the automatic transmission 18 is performed and, therefore, the adjustment of the first electric motor torque Tmg1 can certainly be performed by giving/receiving the electric power between the first electric motor MG1 and the second electric motor MG2. Thus, the loss of the torque converter 16 can certainly be increased regardless of the charged capacity SOC of the electric storage device 36 etc.

Although an example of the present invention has been described in detail with reference to the drawings, the present invention is not limited to this example and may be implemented in other forms.

For example, in the example, basic control is provided as the engine operating point control of setting the target engine operating point as an engine operating point at which the target engine output Pe* is achieved on the engine minimum fuel consumption rate line $L_{FL}$ or an engine operating point at which the total efficiency $\eta_{TOTAL}$ is maximized and, if the operating oil temperature THoil is lower, the target engine operating point is set as an engine operating point changed such that the speed ratio e of the torque converter 16 is reduced as compared to when the operating oil temperature THoil is higher; however, this is not a limitation. For example, even if the basic control is provided as setting the engine operating point (passive engine operating point) at which the engine torque Te is balanced with the pump torque Tp, the present invention is applicable. Alternatively, even if the basic control is provided as the engine operating point control in a power shunt state in which the first electric motor MG1 generates electric power while the second electric motor MG2 consumes the electric power, and the basic control is provided as setting the passive engine operating point in the power circulation state in which the first electric motor MG1 consumes electric power while the second electric motor MG2 generates electricity, the present invention is applicable. In the engine operating point control, the power circulation state may obviously be permitted in some cases.

Although the automatic transmission 18 is subjected to the shift control such that the operating points of the first electric motor MG1 and the second electric motor MG2 fall within the respective ranges of rated outputs of the electric motors when warm-up is promoted in the example, the automatic transmission 18 may be subjected to the shift control in combination with the switching of the basic control (e.g., separately using two forms of reducing the speed ratio e of the torque converter 16 described with reference to FIG. 11).

Although an example of the upshift line changed depending on the operating oil temperature THoil is illustrated as an upshift line changed to the lower vehicle speed side to advance an upshift of the automatic transmission 18 when the operating oil temperature THoil is lower as depicted in FIG. 13 in the example, this is not a limitation. For example, an upshift line may be switched in two stages corresponding to the high and low operating oil temperatures THoil, or an upshift line may be switched in three stages corresponding to the high, middle, and low operating oil temperatures THoil, or other various forms may be available.

Although the automatic transmission 18 is a stepped transmission in the example, the automatic transmission 18 may be a continuously variable transmission (CVT) capable of continuously varying the gear ratio γat.

Figure 17:
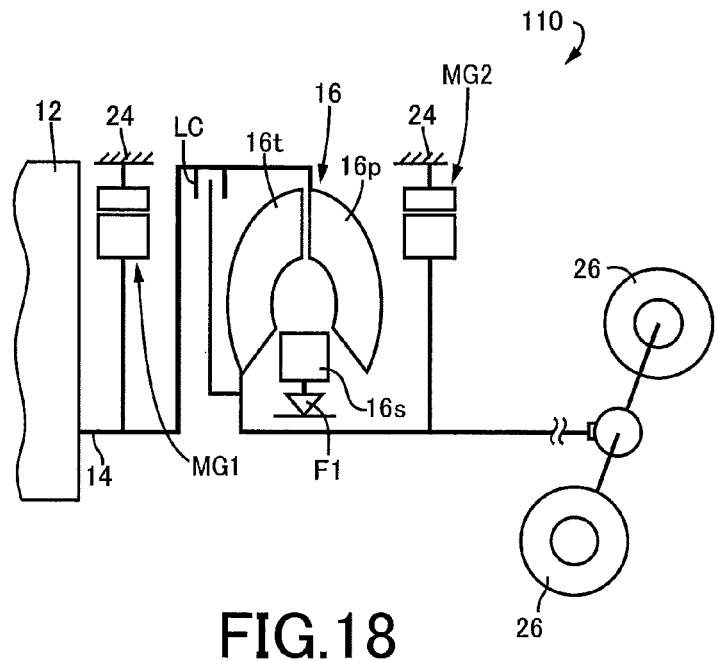
FIG. 17 is a schematic for explaining a configuration of a vehicle drive device different from FIG. 1 and a schematic for explaining a configuration of a vehicle drive device without the automatic transmission.

Although the vehicle drive device 10 includes the automatic transmission 18 subjected to the automatic shift control in the example, a configuration without the automatic transmission 18 may be conceivable as in the case of a vehicle drive device 110 depicted in FIG. 17, for example.

Figure 20:
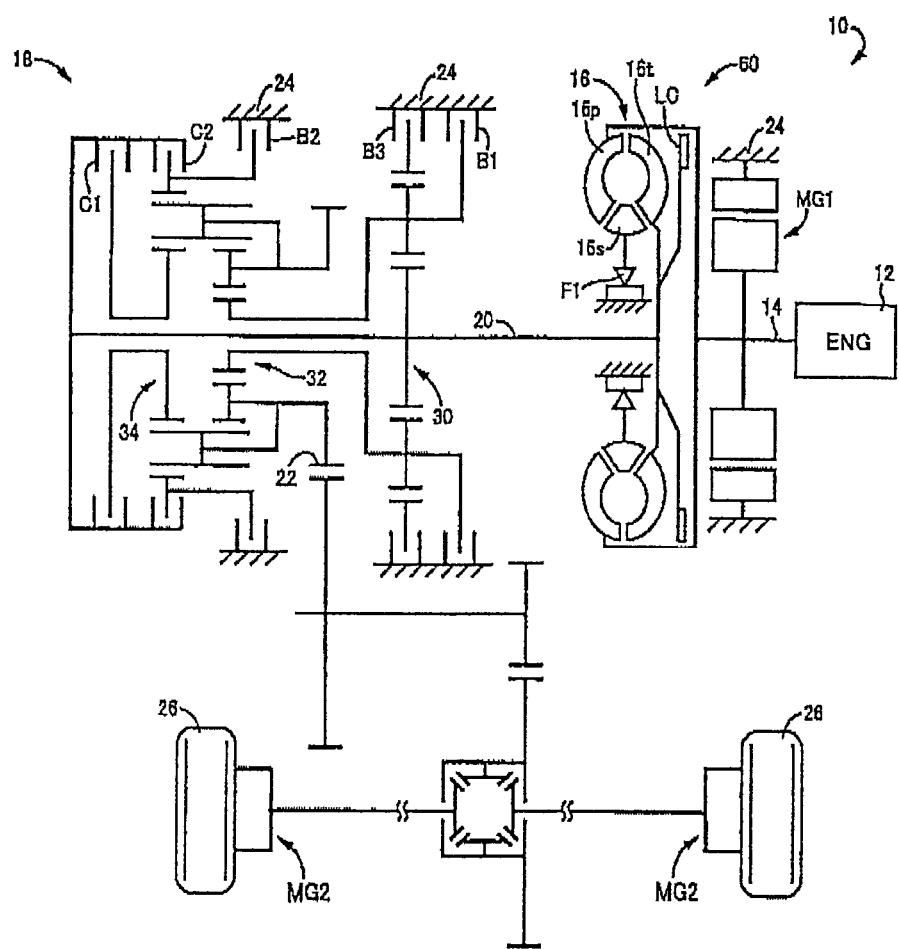
FIG. 20 is a schematic corresponding to FIG. 1 and showing an arrangement in which wheel-in motors as the second electric motors are disposed the respective drive wheels so as to be directly coupled to the drive wheels.

In the example, the second electric motor MG2 is coupled to the input shaft 20 of the automatic transmission 18 as depicted in FIG. 1 and, therefore, the second electric motor MG2 is indirectly coupled via the automatic transmission 18 to the drive wheels 26; however, the second electric motor MG2 may be coupled to the output gear 22 instead of the input shaft 20. The second electric motor MG2 may be a wheel-in motor built into the drive wheels 26. In this case, a total of the two second electric motors MG2 is disposed in the left and right drive wheels 26. FIG. 20 shows an arrangement in which the second electric motors MG2, which are the wheel-in motors, are disposed in the respective drive wheels 26, so as to be directly coupled to the drive wheels 26.

In the example, the second electric motor MG2 is coupled to the drive wheels 26 that are front wheels indirectly coupled to the engine 12 as depicted in FIG. 1; however, the engine 12 and the first electric motor MG1 may be coupled to the front wheels as depicted in FIG. 1 while the second electric motor MG2 may directly or indirectly be coupled to rear wheels instead of the front wheels. If the second electric motor MG2 is coupled to the rear wheels in this way, the rear wheels are included in drive wheels. In short, the drive wheels driven by the power from the engine 12 may be wheels different from the drive wheels driven by the power from the second electric motor MG2.

Although the first electric motor torque Tmg1 is adjusted in the engine operating point control, i.e., the continuously variable transmission operation of the continuously variable transmission 60 described in the example, the first electric motor torque Tmg1 may directly be adjusted or may be adjusted as a result of adjustment of the second electric motor torque Tmg2, i.e., adjustment of the output of the second electric motor MG2, or in other words, in an indirect manner.

In the example, the power transmission is electrically performed through the electric path by giving and receiving electric power between the first electric motor MG1 and the second electric motor MG2; however, for example, the electric power generated by the first electric motor MG1 may directly be supplied to the second electric motor MG2 without via the electric storage device 36, or the electric power generated by the first electric motor MG1 may indirectly be supplied to the second electric motor MG2 in such a manner that the electric power generated by the first electric motor MG1 is once stored in the electric storage device 36 and then supplied from the electric storage device 36 to the second electric motor MG2. The same applies to the time of the power circulation.

In the example, the power transmission is electrically performed through the electric path in the engine operating point control by giving and receiving electric power between the first electric motor MG1 and the second electric motor MG2; however, for example, the second electric motor MG2 may be driven by the supply of electric power from the electric storage device 36, or the supply of electric power from the electric storage device 36 along with the supply of electric power generated by the first electric motor MG1. The same applies to the electric power supply to the first electric motor MG1 in the case of power running of the first electric motor MG1 at the time of the power circulation.

Figure 21:
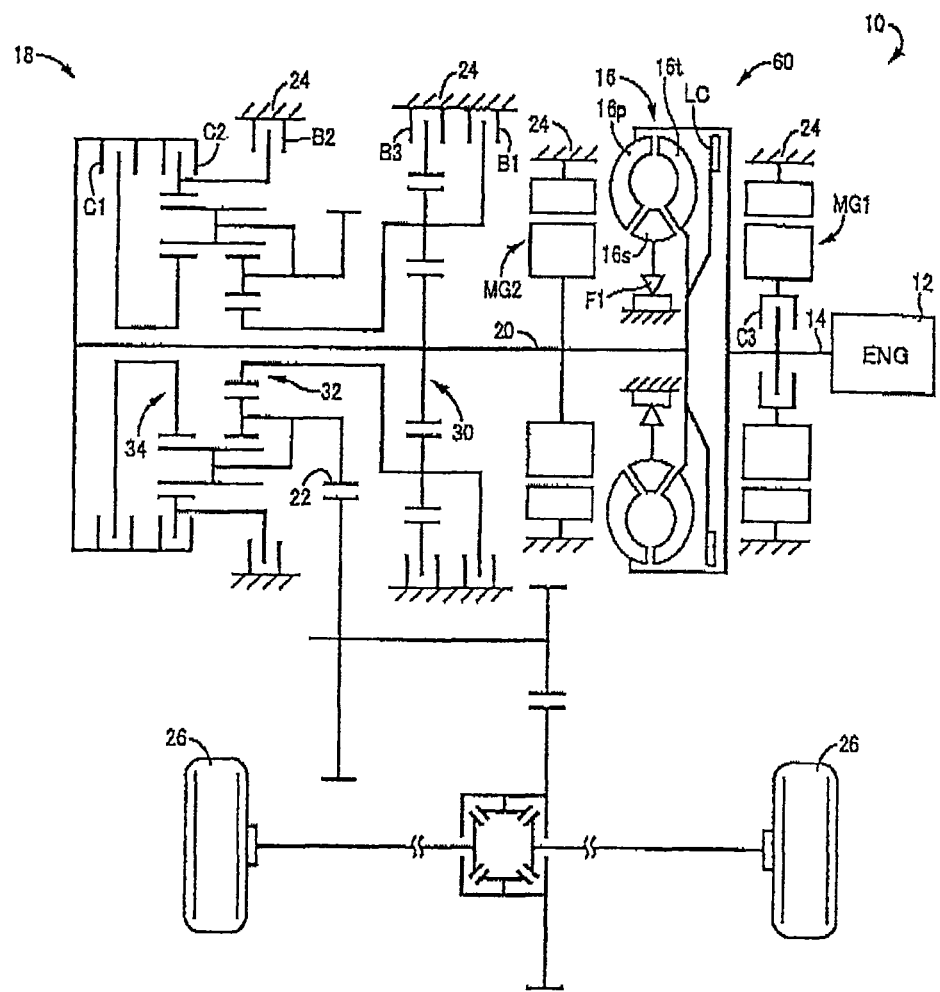
FIG. 21 is a schematic corresponding to FIG. 1 and showing an arrangement in which the first electric motor is indirectly coupled to a pump impeller of the torque converter via a clutch.

Although the first electric motor MG1 is directly coupled to the pump impeller 16 p of the torque converter 16 as depicted in FIG. 1 in the example, the first electric motor MG1 may indirectly be coupled to the pump impeller 16 p via a transmission, a clutch, or an electric belt. FIG. 21 shows an arrangement in which the first electric motors MG1 is indirectly coupled to the pump impeller 16p via a clutch C3.

Although the vehicle drive device 10 includes the electric storage device 36 in the example, the electric storage device 36 may not be included.

Although SA3 is followed by SA4 in the flowchart of FIG. 10 in the example, either of these steps may come first and, for example, in the flowchart, after SA2 is followed by SA4, if the determination at SA4 is affirmative, the operation may go to SA3, and SA3 may be followed by SA5.

Although the engine rotation speed Ne indicated by the target engine operating point is increased by the predetermined change amount ΔNe to determine a new target engine operating point at SA5 of the flowchart of FIG. 10 in the example, the engine rotation speed Ne may be decreased by the predetermined change amount ΔNe to determine a new target engine operating point. In such a case, at SA9 of FIG. 10, the engine rotation speed Ne indicated by the current target engine operating point determined at SA5 is increased by the predetermined change amount ΔNe to determine a new target engine operating point.

With regard to the flowchart depicted in FIG. 10 of the example, it is conceivable that the flowchart may not include steps SA3 to SA10 so that SA11 is executed after SA2.

Although the target engine operating point is set on the engine minimum fuel consumption rate line $L_{FL}$ as indicated by, for example, the point P05 in FIG. 9 in the example, it is conceivable that the target engine operating point is set out of the engine minimum fuel consumption rate line $L_{FL}$.

Although the vehicle can perform the motor running in the example, the vehicle may always run by performing the engine running.

Although the torque converter 16 includes the lockup clutch LC in the example, the lockup clutch LC is released in the continuously variable transmission operation of the continuously variable transmission 60 and, therefore, the lockup clutch LC may not be included.

Although the automatic transmission 18 is shifted to R depicted in FIG. 2 and the input shaft 20 of the automatic transmission 18 is rotated in the positive rotation direction when the vehicle is caused to run backward in the example, the vehicle may be caused to run backward by shifting the automatic transmission 18 to any one of 1st to 6th depicted in FIG. 2 and driving the second electric motor MG2 in the negative rotation direction.

Although the vehicle drive devices 10 and 110 include the torque converter 16 as a fluid transmission device in the example, a fluid coupling may be disposed instead of the torque converter 16 unless the torque amplification effect is utilized in the form.

In the example, the vehicle drive devices 10 and 110 are used in vehicles of various drive types such as an FF type and an FR (front-engine rear-drive) type.

Although the transmission rates $RTO_{PEL}$ and $RTO_{PMC}$ of the electric path and the mechanical path are not changed stepwise as depicted in FIG. 6 in the continuously variable transmission operation of the continuously variable transmission 60 in the example, since the transmission efficiency $\eta_{EL}$ of the electric path is higher than the transmission efficiency $\eta_{MC}$ of the mechanical path in the lower speed ratio range relative to the speed ratio indicated by the intersection point between the dashed-dotted line and the solid line as depicted in FIG. 8 while the transmission efficiency $\eta_{MC}$ of the mechanical path is higher than the transmission efficiency $\eta_{EL}$ of the electric path in the higher speed ratio range, for example, the power transmission may be performed through only the electric path in the lower speed ratio range and the power transmission may be performed through only the mechanical path in the higher speed ratio range.

In the example, if the operation mode determining portion 70 determines that the system optimum operation mode is selected, the engine operating point control portion 72 shifts the engine operating point to the side of greater total efficiency $\eta_{TOTAL}$; however, instead of the total efficiency $\eta_{TOTAL}$, the engine operating point may be shifted based on a total loss $LSS_{TOTAL}$ acquired by summing a power transmission loss $LSS_{CVT}$ when the power from the engine 12 is transmitted through the electric path and the mechanical path and a loss $LSS_{ENG}$ of the engine 12 (hereinafter referred to as an engine loss $LSS_{ENG}$). Specifically, the engine operating point may be shifted to the side of a smaller total loss $LSS_{TOTAL}$. In this case, as compared to the case that the engine operating point is not changed depending on the total loss $LSS_{TOTAL}$, the efficiency of the vehicle drive device 10 is increased as a whole, i.e., the total loss $LSS_{TOTAL}$ is reduced, and the vehicle fuel efficiency can be improved. The power transmission loss $LSS_{CVT}$ can be calculated based on the power input to the continuously variable transmission 60, i.e., the engine output Pe, and the combined transmission efficiency $\eta_{CVT}$, and the engine loss $LSS_{ENG}$ can be calculated based on a complete combustion engine output $Pe_{CMP}$ that is a lower heating value per unit time when the fuel supplied to the engine 12 is completely combusted, and the engine efficiency $\eta_{ENG}$.

Figure 18:
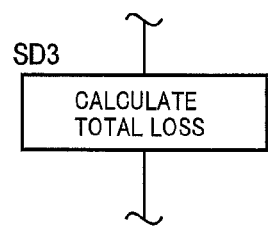
FIG. 18 is a diagram of a step replaced from SA3 of FIG. 10 in order to explain a flowchart different from the flowchart of FIG. 10.
Figure 19:
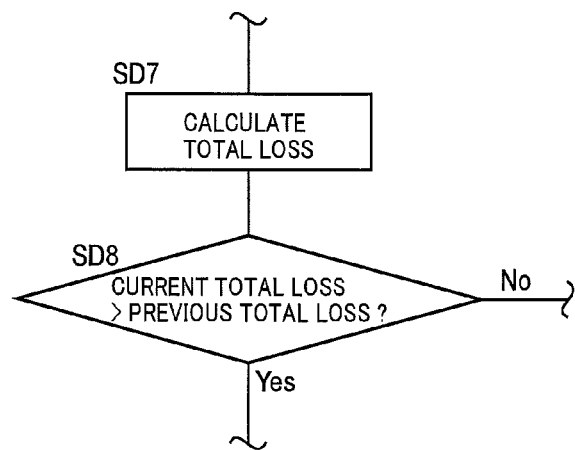
FIG. 19 is a diagram of a step replaced from SA7, SA8 of FIG. 10 in the flowchart explained in FIG. 18.

If the engine operating point is shifted to the side of a smaller total loss $LSS_{TOTAL}$ as described above, in the flowchart of FIG. 10, SA3 is replaced with SD3 of FIG. 18, and SA7 and SA8 are replaced with SD7 and SD8, respectively, of FIG. 19. SD3, SD7, and SD8 correspond to the engine operating point control portion 72.

Specifically describing the flowchart having SD3, SD7, and SD8 in place of SA3, SA7, and SA8 of FIG. 10, in the flowchart, SA2 of FIG. 10 is followed by SD3 of FIG. 18, and SD3 is followed by SA4 of FIG. 10. At SD3, as is the case with SA3, the combined transmission efficiency $\eta_{CVT}$ and the engine efficiency $\eta_{ENG}$ are calculated. Fuel consumption in the engine 12 is sequentially detected over time and the complete combustion engine output $Pe_{CMP}$ is calculated based on the fuel consumption per unit time. Relationship between the complete combustion engine output $Pe_{CMP}$ and the fuel consumption per unit time is empirically obtained in advance, for example. The total loss $LSS_{TOTAL}$ is then calculated based on the calculated combined transmission efficiency $\eta_{CVT}$, the engine efficiency $\eta_{ENG}$, and the complete combustion engine output $Pe_{CMP}$.

SA6 of FIG. 10 is followed by SD7 of FIG. 19. At SD7, as is the case with the SD3, the total loss $LSS_{TOTAL}$ based on the current target engine operating point (referred to as a current total loss) is calculated. A previous total loss, i.e., the total loss $LSS_{TOTAL}$ based on the previous target engine operating point, is stored in advance for determination at SD8 of FIG. 19. SD7 is followed by SD8.

At SD8, it is determined whether the previous total loss is smaller than the current total loss. If the determination at SD8 is affirmative, i.e., if the previous total loss is smaller than the current total loss, the operation goes to SA9 of FIG. 10. On the other hand, if the determination at SD8 is negative, the operation goes to SA5 of FIG. 10. Although the replacement of SA3, SA7, and SA8 with SD3, SD7, and SD8 in the flowchart of FIG. 10 makes the difference described above, the other points are the same as the flowchart of FIG. 10.

The above description is merely an embodiment and, although not exemplarily illustrated one by one, the present invention may be implemented in variously modified and improved forms based on the knowledge of those skilled in the art without departing from the spirit thereof.

NOMENCLATURE OF ELEMENTS

10, 110: vehicle drive device 12: engine 16: torque converter (fluid transmission device) 16*p*: pump impeller (input-side rotating element) 16*t*: turbine impeller (output-side rotating element) 18: automatic transmission 26: drive wheels 40: electronic control device (control device) MG1: first electric motor MG2: second electric motor

The invention claimed is:

1. A control device of a vehicle drive device, the vehicle drive device including a fluid transmission device having an input-side rotating element to which power from an engine is input and an output-side rotating element outputting power to drive wheels, a first electric motor directly or indirectly coupled to the input-side rotating element, and a second electric motor directly or indirectly coupled to the drive wheels, the vehicle drive device having an electric path through which power is electrically transmitted by giving/receiving electric power between the first electric motor and the second electric motor and a mechanical path through which power is mechanically transmitted via the fluid transmission device, the control device being configured to control an operating point of the engine by adjusting an output torque of the first electric motor, the control device being configured to adjust the output torque of the first electric motor such that a sum of an engine torque that is an output torque of the engine and the output torque of the first electric motor is balanced with an input-side load torque generated in the input-side rotating element depending on a speed ratio of the fluid transmission device, and the control device being configured to obtain the input-side load torque based on a rotation speed of the engine indicated by a target engine operating point that is a target of the operating point of the engine, and to determine the output torque of the first electric motor based on the obtained input-side load torque and the engine torque indicated by the target engine operating point, the control device being configured to adjust the output torque of the first electric motor while giving/receiving the electric power between the first electric motor and the second electric motor such that the speed ratio is set based on a temperature of operating oil for actuating the fluid transmission device, wherein the speed ratio is decreased in response to a decrease of the temperature of operating oil for actuating the fluid transmission device.

2. The control device of claim 1, wherein the first electric motor is controlled to generate a power running torque as the output torque of the first electric motor, and the generated power running torque is increased to raise the rotation speed of the engine relative to the operating point, when the engine torque is balanced with the input-side load torque at the operating point, thereby setting the target engine operating point that realizes a target value of the speed ratio which is reduced with reduction of the temperature of the operating oil.

3. The control device of claim 1, wherein the first electric motor is controlled to generate a regenerative torque as the output torque of the first electric motor, and the generated regenerative torque is reduced to raise the rotation speed of the engine relative to the operating point, when the operating point lies on a predefined operating curve of the engine and provides a target output of the engine, thereby setting the target engine operating point that realizes a target value of the speed ratio which is reduced with reduction of the temperature of the operating oil.

4. The control device of claim 1, wherein
the vehicle drive device includes an automatic transmission interposed between the output-side rotating element and the drive wheels, and wherein
the operating oil is oil for actuating the automatic transmission in addition to the fluid transmission device.

5. The control device of claim 4, wherein a gear ratio of the automatic transmission is set based on the temperature of the operating oil wherein the gear ratio is decreased in response to a decrease of the temperature of the operating oil.

6. The control device of claim 4,
wherein when an operating point of the first electric motor is deviated from a rated output of the first electric motor upon reduction of the speed ratio of the fluid transmission device, a gear ratio of the automatic transmission is changed such that the operating point of the first electric motor falls within the rated output of the first electric motor,
wherein when an operating point of the second electric motor is deviated from a rated output of the second electric motor upon reduction of the speed ratio of the fluid transmission device, the gear ratio of the automatic transmission is changed such that the operating point of the second electric motor falls within the rated output of the second electric motor, and
wherein when the operating points of the first and second electric motors are deviated from the rated outputs of the first and second electric motors, respectively, upon reduction of the speed ratio of the fluid transmission device, the gear ratio of the automatic transmission is changed such that the operating points of the first and second electric motors fall within the rated outputs of the first and second electric motors, respectively.

7. The control device of claim 6, wherein
when a rotation speed the operating point of the first electric motor is deviated from the rated output of the first electric motor upon adjustment of the output torque of the first electric motor which is made for reducing the speed ratio of the fluid transmission device, an upshift of the automatic transmission is performed, and wherein
when an output torque of the second electric motor for acquiring power of the second electric motor in giving/receiving of electric power between the first electric motor and the second electric motor is deviated from the rated output of the second motor, a downshift of the automatic transmission is performed.

8. The control device of claim 1, wherein when no warm-up request is made for the vehicle drive device, the operating point of the engine is controlled by adjusting the output torque of the first electric motor such that the operating point of the engine lies on a predefined operating curve of the engine while providing a target output of the engine.

9. The control device of claim 8, wherein total efficiency is represented by a product of power transmission efficiency when power from the engine is transmitted through the electric path and the mechanical path and efficiency of the engine at the operating point of the engine, and wherein the total efficiency is sequentially obtained while the operating point of the engine is shifted, so as to shift the operating point of the engine such that the total efficiency is increased.

10. A control device of a vehicle drive device, the vehicle drive device including a fluid transmission device having an input-side rotating element to which power from an engine is input and an output-side rotating element outputting power to drive wheels, a first electric motor coupled to the input-side rotating element, and a second electric motor coupled to the drive wheels, the vehicle drive device having an electric path through which power is electrically transmitted by giving/receiving electric power between the first electric motor and the second electric motor and a mechanical path through which power is mechanically transmitted via the fluid transmission device,
the control device being configured to control an operating point of the engine by adjusting an output torque of the first electric motor,
the control device being configured to adjust the output torque of the first electric motor such that a sum of an engine torque that is an output torque of the engine and the output torque of the first electric motor is balanced with an input-side load torque that is generated in the input-side rotating element depending on a speed ratio of the fluid transmission device, and
the control device being configured to obtain the input-side load torque based on a rotation speed of the engine indicated by a target engine operating point that is a target of the operating point of the engine, and to determine the output torque of the first electric motor based on the obtained input-side load torque and the engine torque indicated by the target engine operating point,
the control device being configured to adjust the output torque of the first electric motor while giving/receiving the electric power between the first electric motor and the second electric motor, such that the speed ratio is set based on a temperature of operating oil for actuating the fluid transmission device, wherein the speed ratio is decreased in response to a decrease of the temperature of operating oil for actuating the fluid transmission device.

* * * * *

UNITED STATES PATENT AND TRADEMARK OFFICE
CERTIFICATE OF CORRECTION

PATENT NO. : 9,604,525 B2  
APPLICATION NO. : 14/357838  
DATED : March 28, 2017  
INVENTOR(S) : Atsushi Tabata et al.

Page 1 of 1

It is certified that error appears in the above-identified patent and that said Letters Patent is hereby corrected as shown below:

In the Specification

At Column 20, Line 26, change the content from:
"LOS. When"
To:
"L05. When"

In the Claims

At Column 31, Line 2, change the content from:
"a rotation speed the operating point of the first"
To:
"a rotation speed of the first"

Signed and Sealed this  
Thirty-first Day of July, 2018

Andrei Iancu  
*Director of the United States Patent and Trademark Office*